US011601545B2

(12) United States Patent
Grunfeld

(10) Patent No.: US 11,601,545 B2
(45) **Date of Patent: *Mar. 7, 2023**

(54) SYSTEM FOR PREVENTING TEXTING WHILE DRIVING AND OFFERING USAGE-BASED INSURANCE BENEFITS

(71) Applicant: Eric Grunfeld, Alpine, NJ (US)

(72) Inventor: Eric Grunfeld, Alpine, NJ (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/201,938

(22) Filed: Mar. 15, 2021

(65) Prior Publication Data

US 2021/0218837 A1 Jul. 15, 2021

Related U.S. Application Data

(63) Continuation of application No. 16/790,255, filed on Feb. 13, 2020, now Pat. No. 10,951,752.

(Continued)

(51) Int. Cl.

| | |
|---|---|
| ***H04M 3/00*** | (2006.01) |
| ***H04M 1/72463*** | (2021.01) |
| ***H04M 1/04*** | (2006.01) |
| ***G06Q 40/08*** | (2012.01) |
| ***H04W 4/02*** | (2018.01) |
| ***G06K 7/10*** | (2006.01) |

(Continued)

(52) U.S. Cl.

CPC .... *H04M 1/72463* (2021.01); *G06K 7/10297* (2013.01); *G06Q 40/08* (2013.01); *H04L 63/0869* (2013.01); *H04M 1/04* (2013.01); *H04M 1/72406* (2021.01); *H04M 1/72412* (2021.01); *H04M 1/72454* (2021.01); *H04W 4/027* (2013.01); *H04W 12/06* (2013.01)

(58) Field of Classification Search

CPC ......... H04M 1/72463; H04M 1/72412; H04M 1/72406; H04M 1/72454; H04M 1/04; G06K 7/10297; G06Q 40/08; H04W 4/027; H04W 12/06; H04L 63/0869

USPC ........................................................ 455/418

See application file for complete search history.

(56) References Cited

U.S. PATENT DOCUMENTS

| | | | |
|---|---|---|---|
| 8,527,013 | B2 | 9/2013 | Guba et al. |
| 8,635,091 | B2 | 1/2014 | Amigo et al. |

(Continued)

OTHER PUBLICATIONS

Cell Control Product Sheet, "Mobile Device Control and Employee Management," 7 pages.

*Primary Examiner* — Temica M Beamer

(74) *Attorney, Agent, or Firm* — Leason Ellis LLP

(57) ABSTRACT

What is disclosed is a system and method for preventing texting while driving and offering usage-based rewards. The system comprises a phone holder mounted within a vehicle and an application running on the driver's smartphone. A control circuit of the phone holder is configured to detect the smartphone in the holder, detect vehicle motion. An NFC tag on the holder also launches the smartphone application. Depending on measured parameters and determinations made by the "smart" holder and smartphone application, usage data is recorded by the control circuit and/or smartphone. The in-vehicle system is also configured to connect to a cloud-based server for storing vehicle and phone usage data and calculating usage-based rewards, such as insurance benefits for plan members. The system can also include an electronic notification device affixed to the rear windshield of the vehicle and that is selectively switched on to indicate active use of the system.

18 Claims, 17 Drawing Sheets

1000

[10A.2] or [10C.6]

No phone connected to the phone holder or the phone holder is not in the car as entitled driver begins to drive.

- All entitled drivers within a car, their phones recognize their position in a moving car.
- The application will realize this and the complete inactivity with the phone holder thus deducting the earned insurance benefits accordingly from the car the member most recently drove.

START Driver enters car.

Recognized as entitled or non-entitled driver through the wireless sync process.

Entitled Driver [10A.3]

Success of the wireless sync process indicates entitled driver

The application alone will then collect data pertaining to the total amount of time this Logic gate scenario will occur – [10.A3] - wireless connection is successful along with the pressure sensor and accelerometer being active.

Driver turns on car and proceeds to put their phone on the phone holder dock prior to driving.

Non-Entitled Driver [10A.1]

- Wireless sync process failure dictates phone holder to store data on the microcontroller.
- The data being stored in this case is interpreted as the amount of time an anonymous driver is driving while using their phone.

- Once reconnected to any entitled driver this total amount of anonymous driving data will then be transmitted to that specific member within the car tab and impact his insurance rate accordingly.
- At the end of the billing period, any anonymous driving data that remains on the phone holder can then be transmitted via Bluetooth to the mobile application.

Related U.S. Application Data

(60) Provisional application No. 62/805,540, filed on Feb. 14, 2019.

(51) Int. Cl.

| | |
|---|---|
| ***H04W 12/06*** | (2021.01) |
| ***H04L 9/40*** | (2022.01) |
| ***H04M 1/72406*** | (2021.01) |
| ***H04M 1/72412*** | (2021.01) |
| ***H04M 1/72454*** | (2021.01) |

(56) References Cited

U.S. PATENT DOCUMENTS

| | | | |
|---|---|---|---|
| 8,706,143 | B1 | 4/2014 | Elias |
| 9,866,677 | B1 | 1/2018 | Maguire |
| 2014/0335902 | A1 | 2/2014 | Gomez |
| 2016/0050309 | A1 | 2/2016 | Gooberman |
| 2016/0090055 | A1 | 3/2016 | Breed |

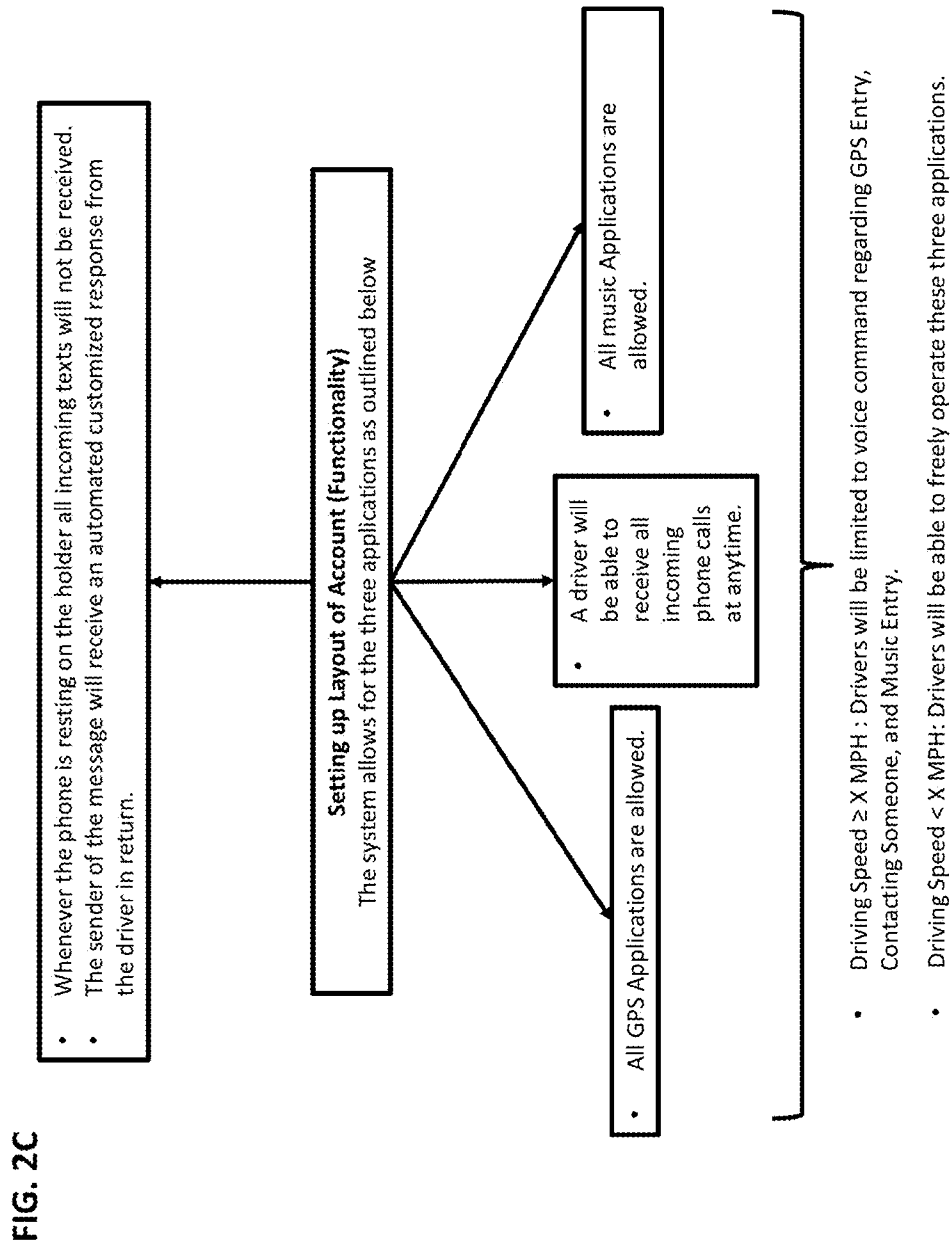

FIG. 2C
Whenever the phone is resting on the holder all incoming texts will not be received.
The sender of the message will receive an automated customized response from the driver in return.
Setting up Layout of Account (Functionality)
The system allows for the three applications as outlined below
All GPS Applications are allowed.
A driver will be able to receive all incoming phone calls at anytime.
All music Applications are allowed.
Driving Speed ≥ X MPH : Drivers will be limited to voice command regarding GPS Entry, Contacting Someone, and Music Entry.
Driving Speed < X MPH: Drivers will be able to freely operate these three applications.

Application Layout – User Interface

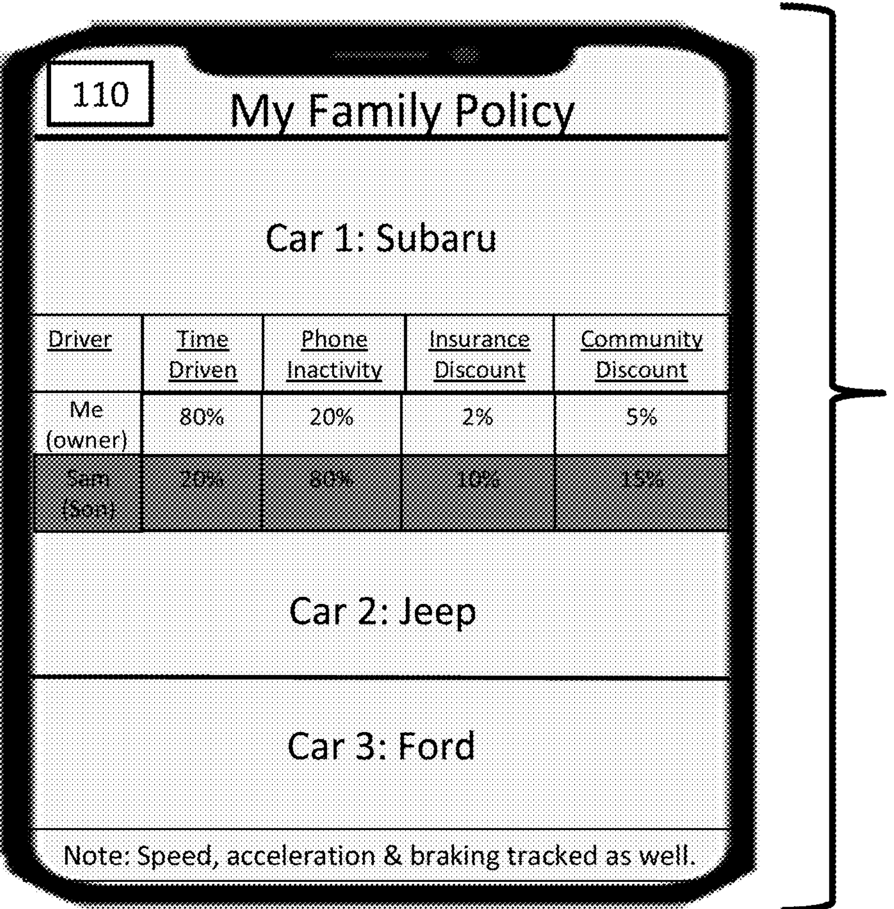

FIG.3

1. Owners/Account administrator and members have their own individual driving activity score while a temporary member's score reflects the owner/account administrator & member that invited them.
2. Owners/Account administrator have oversight of their own driving activity, members they invite driving activity, and temporary members they invite driving activity.
3. Members have oversight of their own driving activity and temporary members they invite driving activity.
4. Temporary members only have oversight of how their driving activity is impacting the owner/account administrator & member to which invited them.
5. Account statuses are interchangeable depending upon the car.

| Pressure Sensor | Accelerometer | NFC Tag | Result (Description Summary) |
| --- | --- | --- | --- |
| 1 (Fig. 9 Circuit 910) | 1 (Fig 9 Circuit 920) | 0 (Fig 9 Circuit 955) | Phone is placed on the car phone holder however, the driver either does not have the application downloaded [10A.1] or is not an entitled member though the system. The phone holder is recording this activity as anonymous driving time where a driver is using his phone. The LED electronic seal will not light up. |
| 0 (Fig. 9 Circuit 905) | 1 (Fig. 9 Circuit 920) | 0 (Fig. 9 Circuit 955) | Phone with the downloaded application is not resting on the car phone holder as the car is moving. The phone recognizes its position in a moving car therefore deducts the earned insurance benefits from the car tab the member most recently drove. The LED electronic seal will not light up. [10A.2]; This same outcome will occur in a scenario of [10C.6] |
| 1 (Fig. 9 Circuit 910) | 1 (Fig. 9 Circuit 920) | 1 (Fig. 9 Circuit 960) | Phone is placed on the car phone holder and registered as an entitled member through the system. As a result, the user is earning his insurance benefits and the LED electronic seal will light up [10 A.3] |

1 – Sensor is active
0 – Sensor is not active
Key

FIG. 10A

| Pressure Sensor | Accelerometer | NFC Tag | Result (Description Summary) |
|---|---|---|---|
| 1 (Fig. 9 Circuit 910) | 0 (Fig. 9 Circuit 915) | 1 (Fig. 9 Circuit 960) | An entitled driver is resting their phone on the car phone holder however, the car is not moving. Since the car is not moving, there is no insurance benefits to be loss or earned. LED seal will not light up. [10C.1] |
| 1 (Fig. 9 Circuit 910) | 0 (Fig. 9 Circuit 915) | 0 (Fig 9 Circuit 955) | A phone is resting on the car phone holder however, the driver is not an entitled driver and the car is not moving. Since the car is not moving, there is no insurance benefits to be loss or earned. LED seal will not light up. [10C.2] |
| 0 (Fig. 9 Circuit 905) | 1 (Fig 9 Circuit 920) | 1 (Fig. 9 Circuit 960) | As the entitled driver drives, he/she places their phone in very close proximity to the phone holder, however, chooses not to rest their phone on the holder. The phone will deduct the earned insurance benefits accordingly. LED seal will not light up [10C.3] |
| 0 (Fig. 9 Circuit 905) | 0 (Fig. 9 Circuit 915) | 1 (Fig. 9 Circuit 960) | The entitled driver is not driving and places their phone in very close proximity to the car phone holder however, chooses not to rest their phone on the holder. Since the car is not moving, there is no insurance benefits to be loss or earned. LED seal will not light up. [10C.4] |
| 0 (Fig. 9 Circuit 905) | 0 (Fig. 9 Circuit 915) | 0 (Fig 9 Circuit 955) | The car phone holder is in the car and is in Idle [10C.5]. As a result, Insurance benefits are neither loss or earned.<br>**Or,** the car phone holder is simply not in the car while the entitled driver is driving with their phone on them [10C.6]. This outcome will then have a direct connection with that of [10A.2.] |

1 – Sensor is active
0 – Sensor is not active
Key

FIG. 10C

SYSTEM FOR PREVENTING TEXTING WHILE DRIVING AND OFFERING USAGE-BASED INSURANCE BENEFITS

CROSS-REFERENCE TO RELATED APPLICATION

This application is a continuation of U.S. patent application Ser. No. 16/790,255 filed on Feb. 13, 2020, now U.S. Pat. No. 10,951,752 issued Mar. 16, 2021, which claims benefit to U.S. Provisional Application 62/805,540 filed on Feb. 14, 2019, titled SYSTEM FOR PREVENTING TEXTING WHILE DRIVING AND OFFERING USAGE-BASED INSURANCE BENEFITS, which are each hereby incorporated by reference herein in their respective entireties.

TECHNICAL FIELD OF THE DISCLOSURE

This patent application relates generally to the field of driver monitoring devices and, more specifically, to a system for preventing texting and driving and optimizing premium rates for insured drivers.

BACKGROUND

In the U.S.A. 390,000 accidents a year, a ¼ of all car accidents, involve texting while driving. Youths or inexperienced drivers are highly correlated with this behavior leaving them as riskier drivers with higher auto insurance policies. A system that more effectively prevents texting while driving and reduces the emotional and financial concerns amongst parents is needed.

Providing an auto owner (e.g. a parent) with the empowerment to monitor in real time and restrict a driver's (e.g., a child) poor and distracted driving behavior will mitigate these concerns. From an emotional perspective, a child's safety is a top prioritization for parents. Therefore, what is needed is a system to assist parents in recognizing any poor or distracted driving behaviors. Simultaneously, a secondary financial concern amongst parents is expressed as they seek a reduction in their high auto insurance policy costs. Accordingly, what is needed is a system to assist with ensuring drivers do not engage in any poor or distracted driving behaviors and give the auto owner an opportunity to minimize the cost of a shared insurance policy through reliably calculating usage-based insurance benefits in a variety of real-world scenarios. Overall, what is needed is a system to provide an owner oversight and accountability upon the vehicle driver activity (e.g., their child's use of the car) to ensure that other authorized drivers are accruing usage-based insurance benefits by not engaging in texting and driving.

From an insurance company's perspective, what is needed is a system that can collect actuary sound data in a variety of scenarios in order to accurately attribute insurance ratings on an individual level with driver to vehicle identification. Further, what is needed is a system that provides the ability to differentiate a driver from a passenger in a vehicle which enables the system to accurately capture vehicle driver activity and provide usage-based rewards. Additionally, what is needed is a system that can collect vehicle and driver phone usage data and that can integrate with the data already collected by the insurance company (e.g., number of tickets, accidents and the like) to further inform carriers what an optimal insured premium is.

It is with respect to these and other considerations that the disclosure made herein is presented.

SUMMARY OF THE INVENTION

Technologies are presented herein in support of a system and method for preventing unsafe usage of a smartphone by a driver while the driver is operating a vehicle and providing usage-based benefits.

According to a first aspect, a system for preventing unsafe usage of a smartphone by a driver while the driver is operating a vehicle and providing usage-based benefits is provided. The system comprises an application enabled on the driver's smartphone wherein the application includes instructions in the form of code that are executable by a processor of the smartphone. The system also comprises a smartphone holder arranged to be mounted inside the vehicle. In particular, the holder comprises a body configured to receive and support the smartphone during normal operation of the vehicle and a mount connected to the body. The mount is adapted to attach to an interior surface of the vehicle such that a screen of the smartphone being supported by the base is facing the driver of the vehicle.

The holder further includes an NFC tag provided within the body, wherein the NFC tag is programmed to launch an instance application enabled on the smartphone. Additionally, the application enabled on the smartphone is configured to launch upon communication with the NFC tag and, upon launch of the application, configures the smartphone to wirelessly transmit identification information to a control circuit of the holder.

The holder further includes a control circuit disposed within the body. In particular, the control circuit comprises a processor, a wireless communication interface in electronic communication with the processor and an accelerometer in electronic communication with the processor. The control circuit further comprises a sensor for detecting the presence of the smartphone resting on the body wherein the is in electronic communication with the processor.

Additionally, the control circuit comprises a computer-readable storage medium accessible by the processor, wherein instructions are stored in the storage medium. In particular, the instructions are executable by the processor and configure the processor to determine, based on a signal output by the accelerometer, whether the vehicle is moving at a speed in excess of a prescribed threshold. The processor is further configured to determine, based on a signal output by the pressure sensor, whether the smartphone is resting against the body of the phone dock.

The instructions stored in the storage medium further configure the processor of the control circuit to receive identification information from the smartphone via the wireless communication interface and determine, based on the identification information and information identifying entitled drivers stored in the storage medium, whether the smartphone is associated with a driver that is entitled to drive the vehicle.

Furthermore, one or more of the application enabled smartphone and the processor of the control circuit are configured to record usage data including information relating to operation of the vehicle and any usage of the smartphone during vehicle operation. The recording of usage-data is performed as a function of determining whether the smartphone is associated with a driver that is entitled to drive the vehicle, determining whether the phone is resting against the body of the phone dock and determining whether the vehicle is moving at a speed in excess of a prescribed threshold.

According to a further aspect, a method for preventing unsafe usage of a smartphone by a driver while the driver is operating a vehicle and providing usage-based benefits. The method comprises providing an application enabled on the driver's smartphone, the application comprising instructions in the form of code that are executable by the smartphone. The method also includes providing a smartphone holder arranged to be mounted inside the vehicle. In particular, the holder includes a body configured to receive and support the smartphone during normal operation of the vehicle, an NFC tag provided within the body, wherein the NFC tag is programmed to launch an instance of the application enabled on the smartphone. The holder also includes a control circuit disposed within the body, wherein the control circuit comprises a processor, a computer-readable storage medium accessible by the processor, a wireless communication interface in electronic communication with the processor, an accelerometer in electronic communication with the processor, and a sensor for detecting the presence of the smartphone resting on the body, the sensor being in electronic communication with the processor. Also included in the holder control circuit are instructions stored in the storage medium and are executable by the processor.

The method further includes the step of determining, by the processor using the accelerometer, whether the vehicle is moving at a speed in excess of a prescribed threshold and determining, by the processor using the pressure sensor, whether the smartphone is resting against the body of the phone dock. The method also includes the step of launching the application responsive to receipt of a signal from the NFC tag, wherein the application enabled on the smartphone is configured to launch upon communication with the NFC tag.

Additionally, the method includes wirelessly transmitting, by the launched application via a wireless communication interface of the smartphone, identification information to the control circuit and receiving, at the processor of the holder, identification information from the smartphone via the wireless communication interface. Furthermore, the method includes the step of determining, with the processor based on the received identification information and information identifying entitled drivers stored in the storage medium, whether the smartphone is associated with a driver that is entitled to drive the vehicle. The method also includes the step of recording, by one or more of the application enabled smartphone and the processor of the control circuit, usage data including information relating to operation of the vehicle and any usage of the smartphone during vehicle operation. In particular, the recording of usage-data is performed as a function of determining whether the smartphone is associated with a driver that is entitled to drive the vehicle, determining whether the phone is resting against the body of the phone dock and determining whether the vehicle is moving at a speed in excess of a prescribed threshold.

These and other aspects, features, and advantages can be appreciated from the accompanying description of certain embodiments of the invention and the accompanying drawing figures and claims.

BRIEF DESCRIPTION OF THE DRAWINGS

FIG. 2C is a flow diagram illustrating an exemplary routine for restricting phone usage by the mobile device application of the system of FIG. 1 according to one or more embodiments of the invention;

FIG. 3 is a screenshot of an exemplary graphical user interface of the mobile device application of the system of FIG. 1 according to one or more embodiments of the invention;

FIG. 10A is a table illustrating exemplary input logic states and resulting operational modes of the system of FIG. 1 during operation of the system in three exemplary real-world scenarios;

FIG. 10C is a table illustrating exemplary input logic states and resulting operational modes of the system of FIG. 1 during operation of the system in an additional five exemplary real-world scenarios;

DETAILED DESCRIPTION OF THE INVENTION

The following description describes exemplary embodiments of systems and methods for preventing texting while driving and offering usage-based rewards and is not intended to limit the scope of the invention. An objective of the system is to provide a system that is easy to use, effectively prevents a driver from distracting phone use and incentivizes drivers to use the system by automatically capturing usage data and offering usage-based insurance benefits and/or other such usage-based rewards. A further objective of the system is to provide a system that incentivizes drivers to use the system through external and internal motives. External incentives would be applicable to that of a beginner driver for instance, as he is upheld by his parents to drive safely. Internal incentives reflect a system that captures usage data and offers usage-based insurance benefits and other such rewards accordingly for driving safely. As further described herein the system can be configured such that multiple drivers can utilize a particular vehicle and rewards/related benefits can be calculated for one or more members on a plan relating to the vehicle. As can be appreciated usage-based insurance benefits are one exemplary type of reward discussed herein as a non-limiting example. The system can be utilized to provide other types of rewards or no rewards at all.

Figure 1:
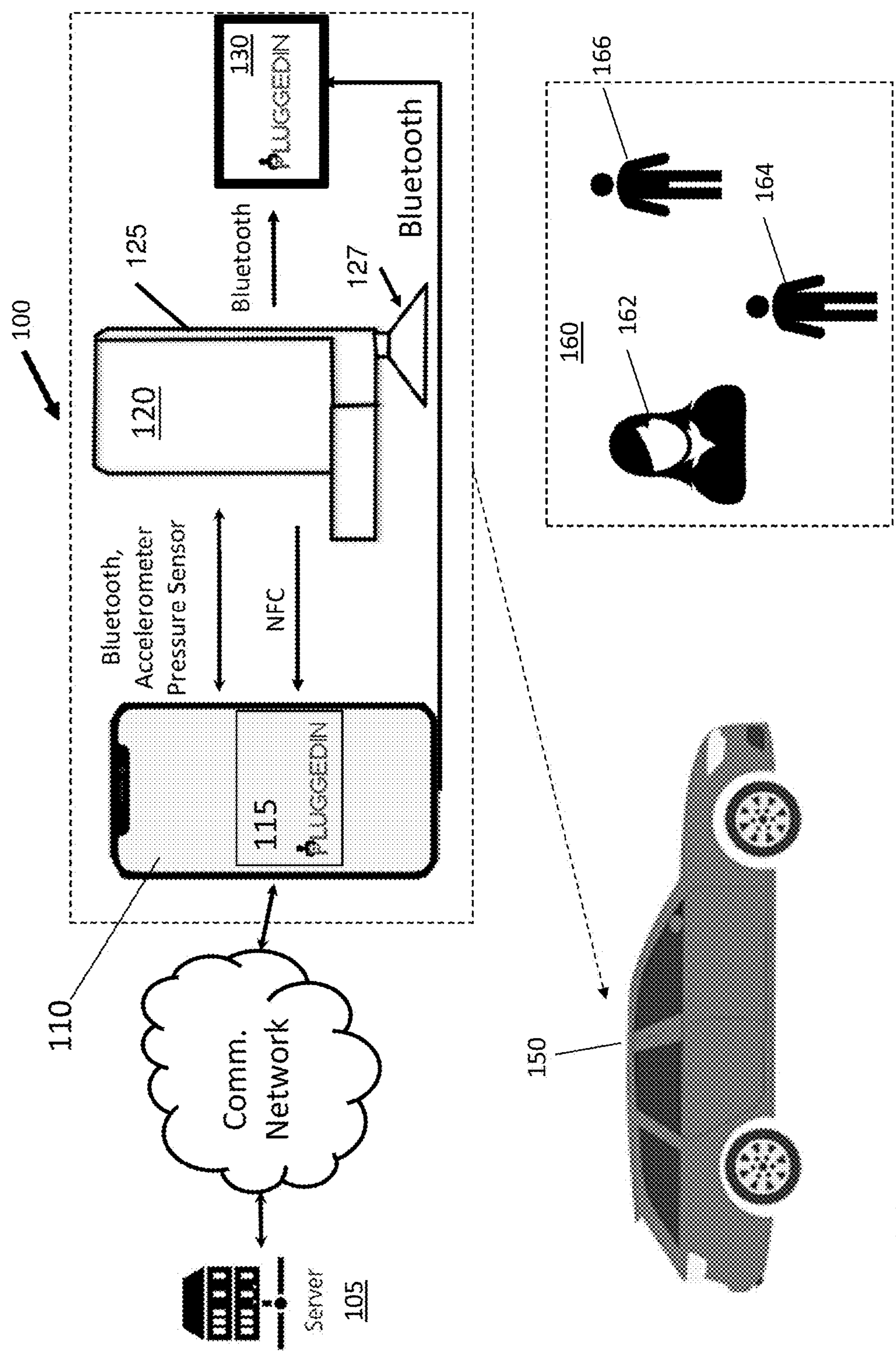
FIG. 1 is a high-level diagram illustrating an exemplary system for preventing texting while driving and offering usage-based rewards according to one or more embodiments of the invention.

An exemplary system for preventing texting while driving and offering usage-based rewards 100 (the system 100) is shown in FIG. 1. Generally, the primary components of the system include a phone holder/dock 120 and an application 115 running on a smartphone 110 (referred to as mobile device or phone or smartphone). The phone dock 120 is arranged to be mounted inside the cabin of a vehicle 150, preferably in a location that is accessible to the driver while sitting in the driver compartment so as to allow the driver to place the phone 110 in the dock and otherwise view or access the phone as necessary. In one or more exemplary configurations the system 100 can also include an electronic notification device or "seal" 130 that is suitable for being affixed to the rear windshield of the vehicle. The seal 130 includes a control circuit and an LED light that is selectively switched on by the control circuit so as to indicate active use of the system 100 to other drivers. One or more of the in-vehicle devices of the system 100, particularly, the mobile device, are also configured to connect to a cloud-based database and data processing component (server 105) for storing vehicle and phone usage data and calculating usage-based rewards, such as insurance benefits for plan members.

Figure 5:
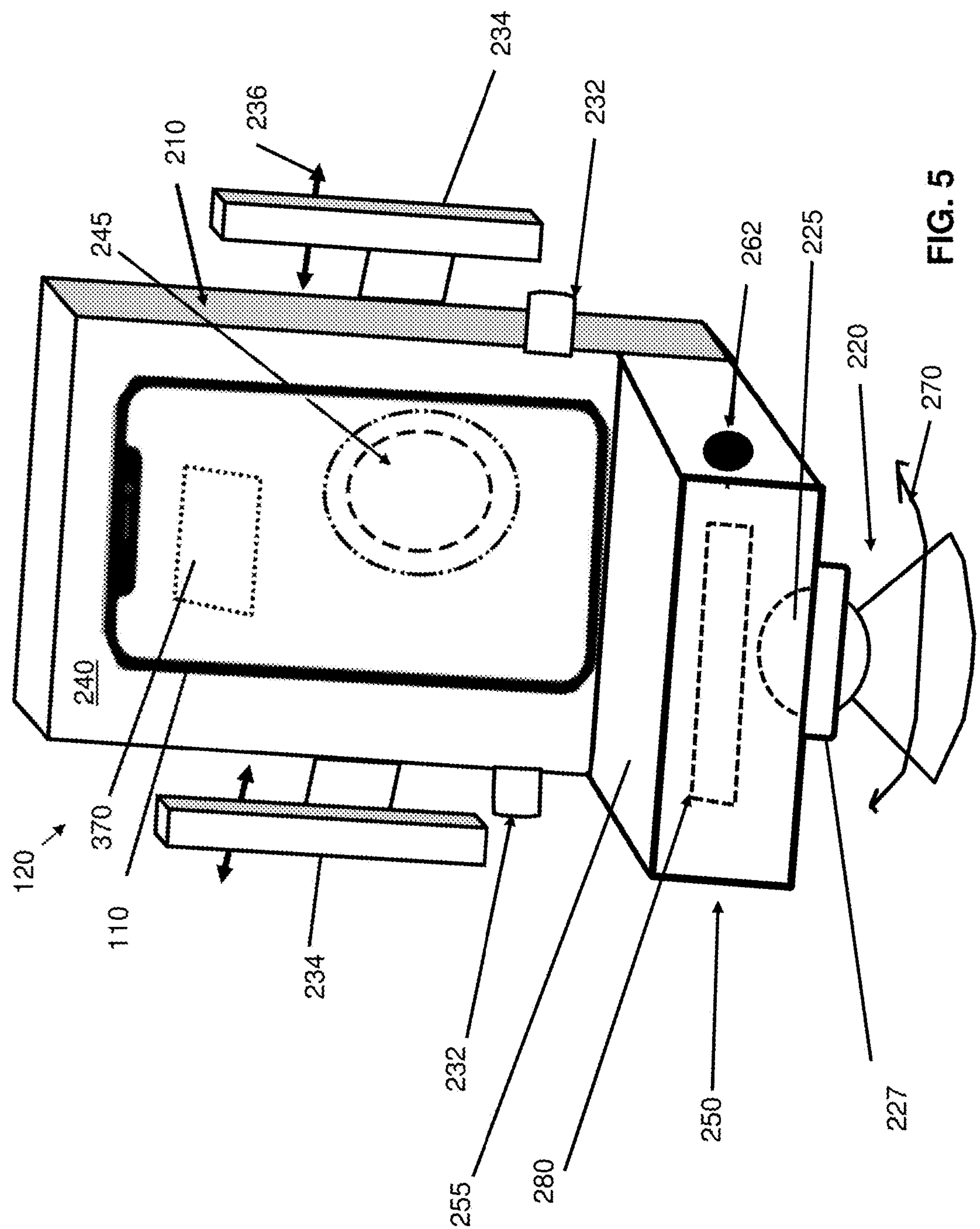
FIG. 5 is a schematic diagram illustrating an exemplary configuration of phone dock for use in the system of FIG. 1 according to one or more embodiments of the invention.

FIG. 5 demonstrates an exemplary configuration of the phone holder 120 in accordance with an embodiment of the disclosure. The phone holder comprises a body portion 210 and a mount 220. The phone dock 120 is configured to be mounted to a car dashboard, windshield or other in-vehicle mounting surface using, for example, an adhesive pad, suction cup, mechanical mechanism, or other suitable attachment mechanism known in the art of in-vehicle phone holders. It should be understood that various alternative arrangements for mounting the phone holder in the vehicle are possible, including but not limited to mounting systems for mounting the phone holder to an air vent or windshield. For purposes of simplicity, this disclosure describes the non-limiting example of a dashboard-mounted phone holder 120.

As shown, the phone dock can also include a pivot mechanism configured to allow the body 210 to pivot relative to the mount 220 attached to the car. For example, the mount 220 can comprise a ball 225 that is received in a complementary shaped socket 227, which can be integrally formed with or attached to the holder base 250 (and/or the body 210), thereby defining a pivoting mechanism. Such a ball joint ensures a sturdy connection between the mount and the phone holder itself. The degree of pivoting about the rotational axis of the mount can be restricted to a specific angle by the pivot mechanism. In one exemplary configuration, the pivoting mechanism can be configured to provide only a limited range of motion, for instance, a 90-degree range of rotation (e.g., in the direction indicated by the arrow 270) generally about the length-wise axis of the holder. This limited range of motion ensures that the phone screen remains generally facing the driver when placed in the dock, assuming proper placement of the phone dock in the vehicle.

As shown in FIG. 5, the phone holder 120 can also include adjustable sliding tabs or "guard rails" 234. The guard rails are provided on opposite sides of the phone holder and extend generally in a direction that the back wall 240 extends from the base 250. The adjustable rails 234 are slideably attached to the body 210 of the phone holder such that their relative position in the width-wise direction 236 can be adjusted (e.g., moved closer or further apart) to ensure that phones of any width can be placed in and securely held by the phone holder 120 during driving. While not shown, the base can also include a top sliding tab and/or an opposing bottom tab. One of the purposes of the tabs can be to hold the phone and sliding tabs provide for adjustability to the size of the phone.

According to a salient aspect, the phone holder can house electronic circuitry or devices that are used to implement various features of the systems and methods for preventing unsafe phone usage while driving described herein. For example, as shown in FIG. 5, the base 250 of the holder can be configured to contain a control circuit 280, the details of which are further described herein.

Figure 8:
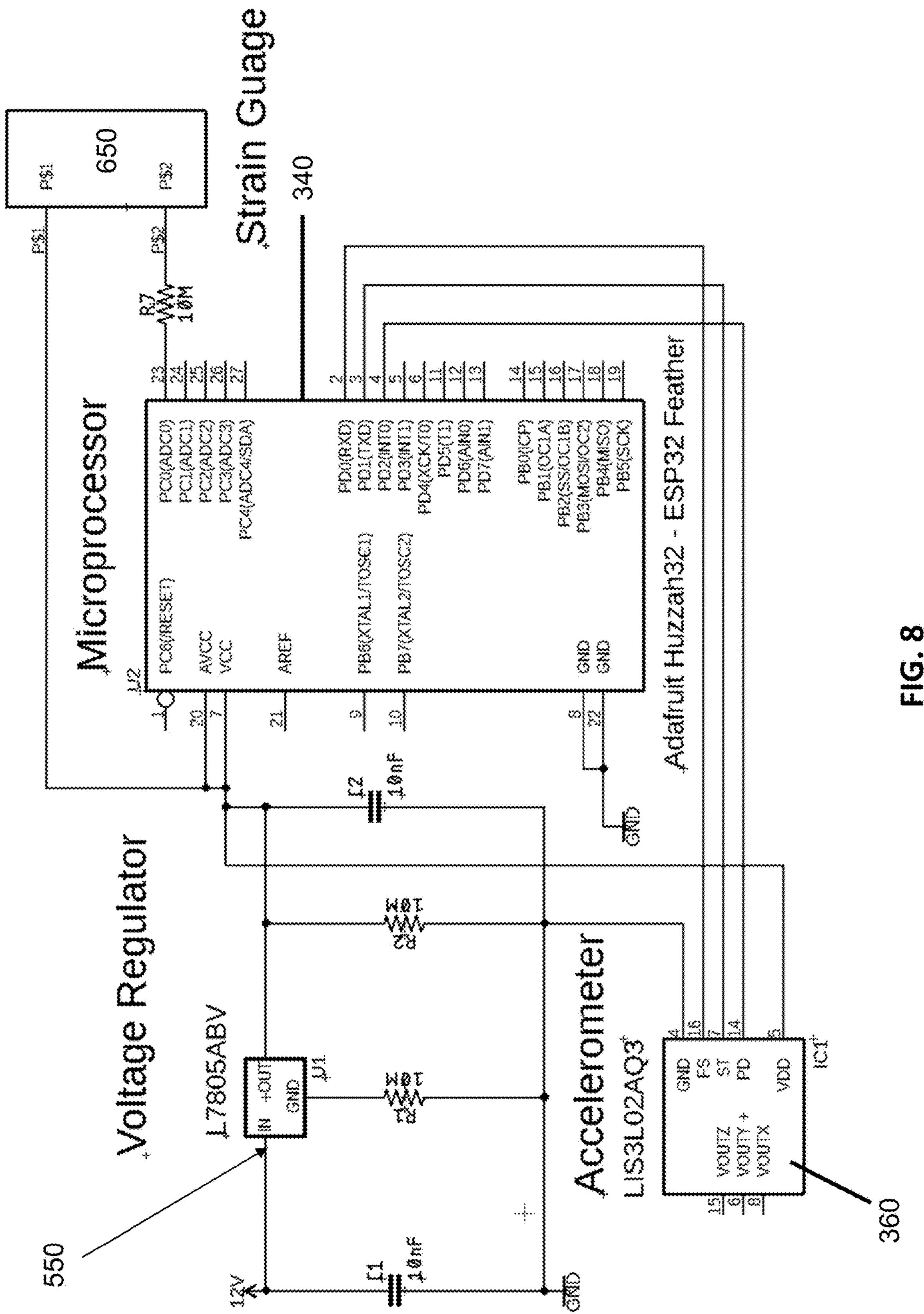
FIG. 8 is a circuit diagram illustrating an exemplary configuration of the control circuit of the phone dock of FIG. 5 according to one or more embodiments of the invention.

For example, as shown in FIG. 5, the phone holder circuit can be powered, for example, using a cord or wire running from a 12V car power supply to a power port 262 located on the phone holder base. Accordingly, the circuit diagram of FIG. 8 illustrates a regulator circuit 550 with an output tolerance of +/−0.01 that can be integrated within the control circuit 280. Essentially, this regulator circuit 550 regulates the 12V power supply and ensures that the control circuit 280 is powered correctly. Arranged in the control circuit 280, there can also be a secondary rechargeable battery power source (not shown) to ensure that the system can still be running even while the phone holder is not receiving power from the 12V car power supply through the primary power port 262 for a period of time. Any indication to the phone holder needing voltage or power from the Car's 12V power supply can be conveyed through a red dimming light that flashes on and off (light not shown). In respects to a further embodiment of the power and charging circuitry, the powering circuit can encompass a USB cord, or can be configured to include an inductive charging circuit integrated into the control circuit 280 and configured to perform inductive charging when a driver places or plugs his phone into the USB port of the phone holder.

As shown in FIG. 5, in one exemplary configuration, the body of the phone holder 120 includes a back wall 240 extending away from the base 250. The holder is configured such that, when a phone 110 is placed on the holder, the back surface of the phone rests against the back wall 240 of the holder and the bottom end of the phone rests against a top wall 255 of the base 250. Accordingly, the phone can be substantially vertically oriented or otherwise maintained at an angle suitable for a driver to view the phone while seated in the driver's compartment of the vehicle.

The base 250 can be configured to contain a control circuit 280, which can be in the form of a printed circuit board, and other electronic devices, for instance, in an interior space of the base located below the top wall 255.

According to a salient aspect, the holder control circuit 280 can be configured to determine whether or not a phone is resting on the holder. This can be achieved using various electronic and/or mechanical devices incorporated into the holder 120. In one exemplary configuration, the top wall 255, which the phone rests on during normal use of the system 100, can move relative to a structure of the base that is fixed in relation to the body.

In one exemplary configuration, the sliding rail mechanism attaching the two arms 245 to the body 210 can include a button 245 configured to automatically trigger a spring loaded mechanism that automatically adjusts the rails into position against the phone. Accordingly, as a result of the phone resting against a physical button 245, this will ultimately allow the adjustable rails to slide in and firmly hold the phone holder in place. The position of the opposing sliding tabs or adjustable guard rails can also serve as an indication of whether a phone is being placed on the car phone holder. For instance, the phone holder control circuit can include sensor devices configured to sense the position of the guard rails such that, when the opposing sliding tabs or adjustable guard rails are resting in a home state position, the phone holder recognizes that there is no phone resting on the holder. This home position encompasses either a full extension of the adjustable guard rail or a state of no extension at all. This state of full or no guardrail extension is in relation to the base and back wall of the phone holder where in either case the adjustable guard rail cannot accommodate the size of any smart phone. Note, that any state of no extension can be reset by squeezing together the release mechanism levers 232. When the phone's guard rails 234 are not resting in a home position, the phone holder circuit can recognize that there is in fact a phone on the holder. In which case, a sensor can be implemented which would recognize a change in the home state position of the adjustable guard rail.

Figure 7A:
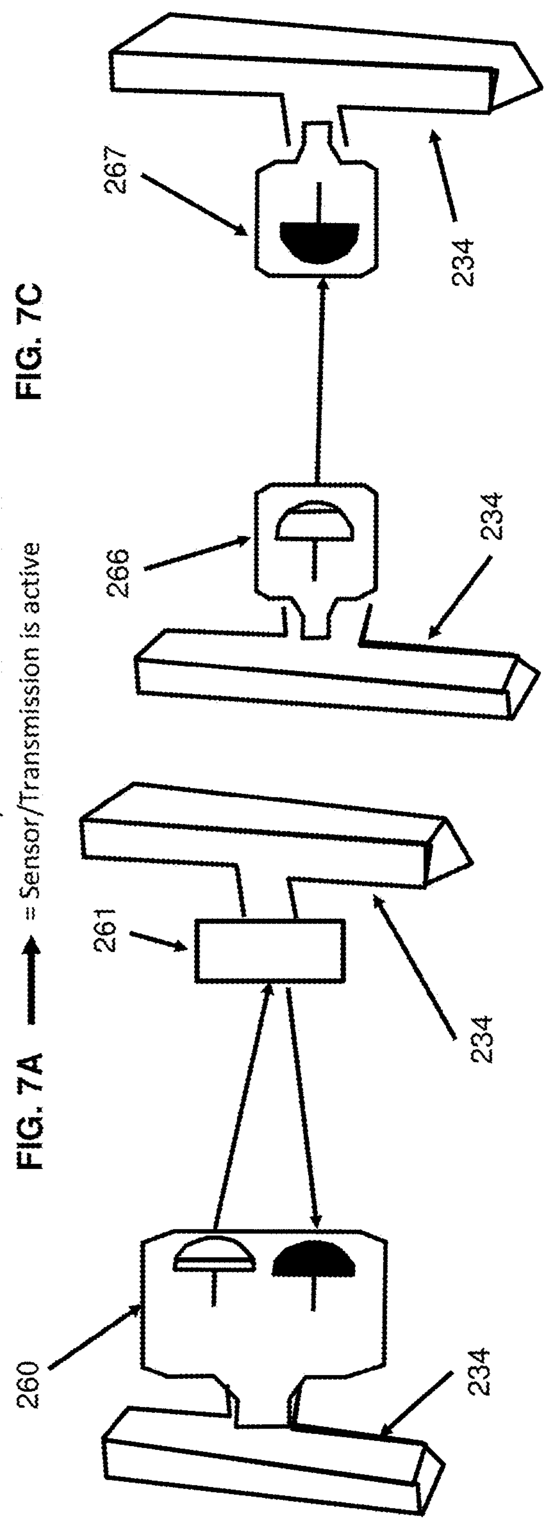
FIG. 7A-7B are schematic diagrams illustrating an exemplary configuration of a device for detecting the presence of a phone in the phone dock of FIG. 5 according to one or more embodiments of the invention.
Figure 7C:
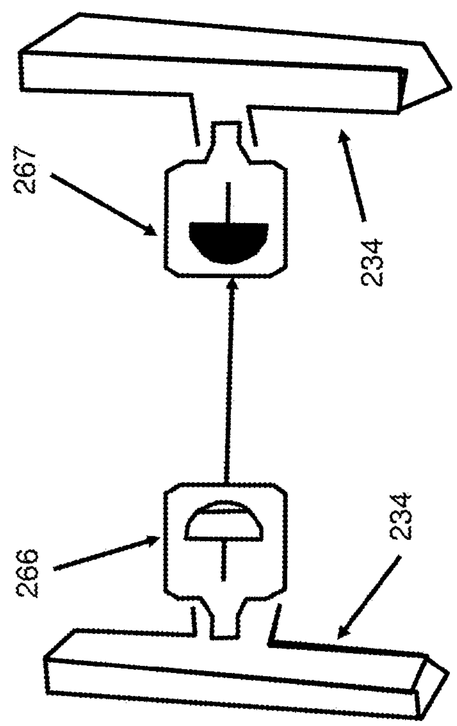
FIG. 7C-7D are schematic diagrams illustrating an exemplary configuration of a device for detecting the presence of a phone in the phone dock of FIG. 5 according to one or more embodiments of the invention.
Figure 7B:
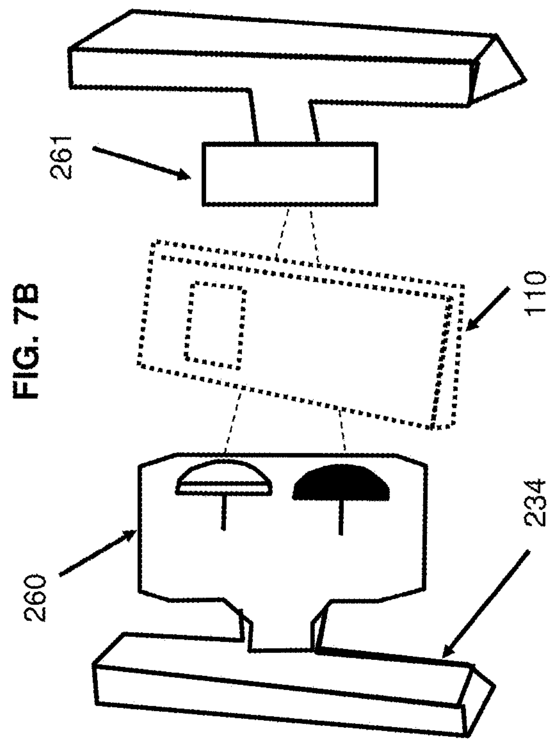
Figure 7D:
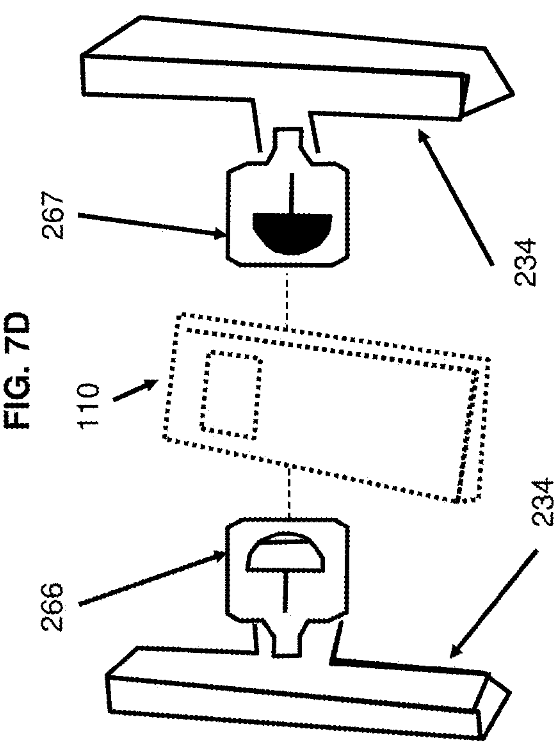

In yet a further example, and as demonstrated in FIGS. 5, 7A-7B there can be a photoelectronic sensor 260 that is emitting an infrared light beam. The photoelectronic sensor can embody a reflective model where the photoelectronic transmitter/receiver 260 is both emitting and receiving an infrared light in correspondence to a reflection reflected by reflector 261, as demonstrated in FIG. 7A. Any interference (e.g. phone being placed on the holder) otherwise will result in the light not being reflected back to the photoelectronic receiver as portrayed in FIG. 7B. In a further embodiment shown in FIG. 7C and FIG. 7D, the photoelectronic sensor can encompass a transmitter 266 on one end and a receiver 267 on the opposing guard rail end (FIG. 7C) both being electronically connected to the circuit 280. Any interference (e.g. phone being placed on the holder) will result in the receiver not receiving transmitted light successfully, as demonstrated in FIG. 7D. In any case where the photoelectronic sensor is not receiving an infrared light beam, this will trip the sensor and thereby send a wired or wireless communication signal to the electronic circuitry 280 or Microcontroller 340.

Figure 6B:
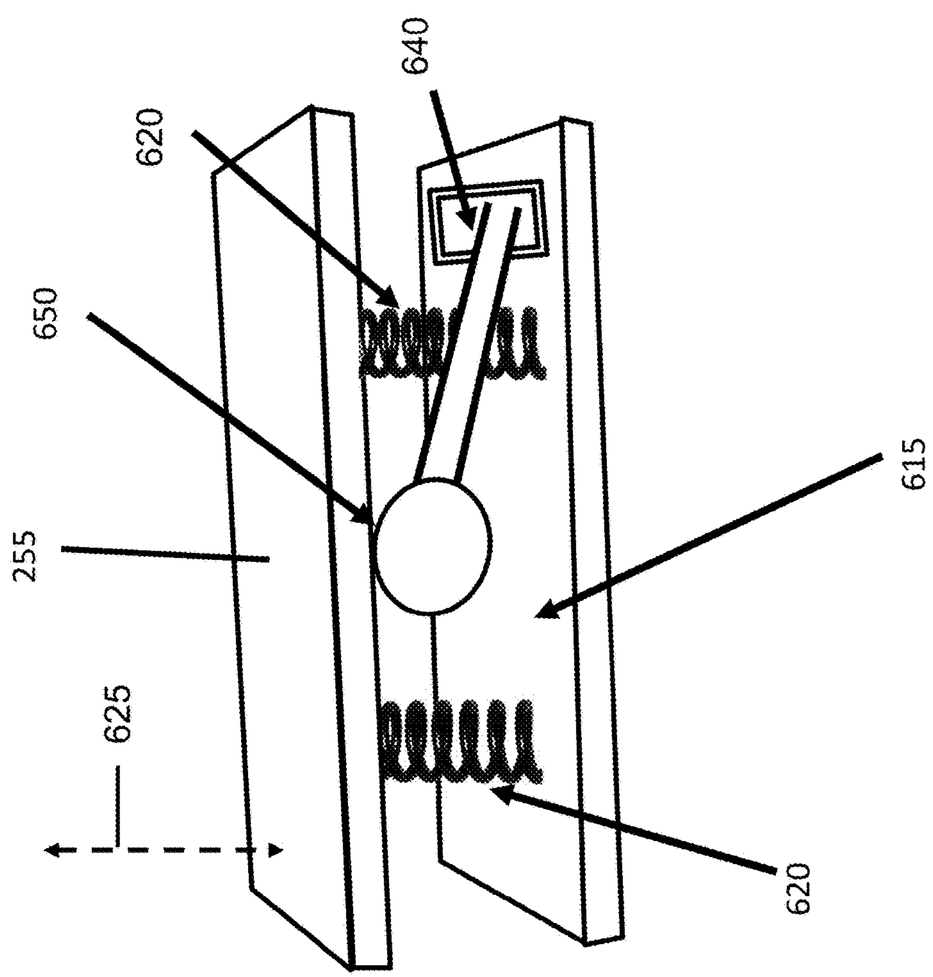
FIG. 6B is a perspective, isolated, view of components of the phone dock of FIG. 5 for detecting the presence of a phone according to one or more embodiments of the invention.
Figure 6A:
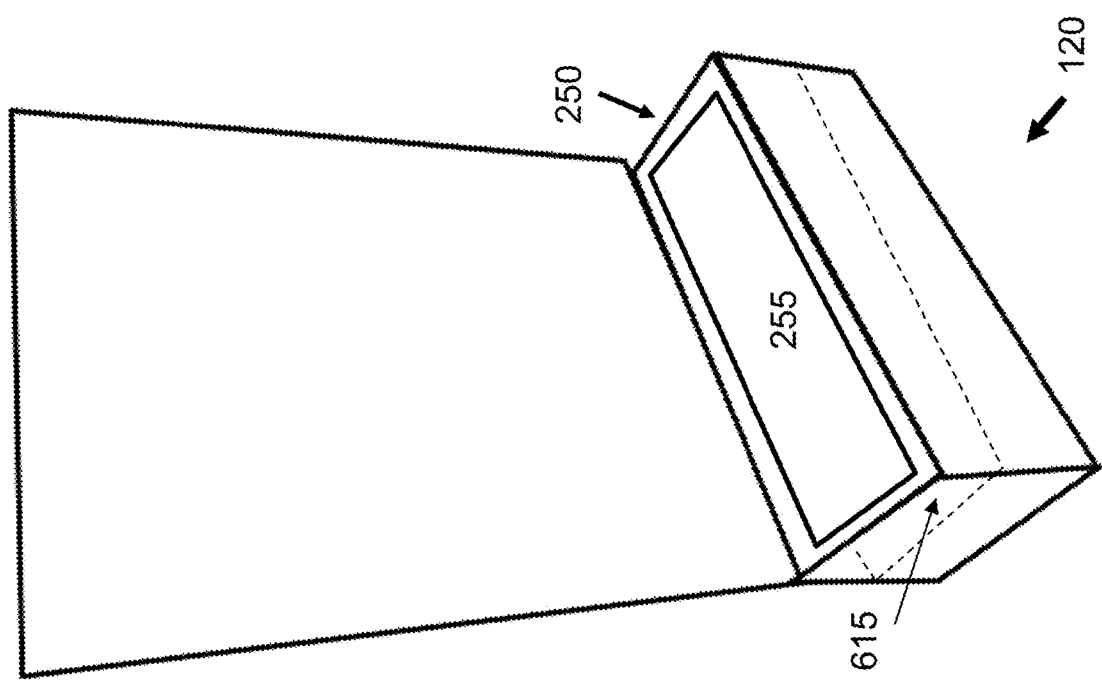
FIG. 6A is a perspective view of the phone dock of FIG. 5 according to one or more embodiments of the invention.

FIG. 6A is a simplified perspective view of the holder 120 and illustrating components of the base 250. FIG. 6B is a is a close-up diagram of a portion of the base structure 250. In particular, both FIGS. 6A and 6B illustrate a top wall 255 of the base 250 which is supported by a horizontal wall 615. The horizontal wall 615 can be arranged within the internal volume of the base 250 or otherwise rigidly mounted to the base 250. As shown, the top wall 255 is supported by the horizontal wall 615 using springs 620 thereby allowing the top wall to move in the up/down direction 625 relative to the fixed horizontal wall 615. Such movement is typically in response to the weight of a phone resting on the wall 255.

In one or more exemplary configurations, a pressure sensor can be used to determine whether a phone is resting against the top wall 255. For example, as shown in FIG. 6B, a slot 640 is provided in the wall 615 to allow a strain gauge pressure sensor 650 to extend from the control circuit (not shown) through the wall 615 and into physical communication with the top wall 255. As the springs 620 compress, the pressure sensor 650 will move indicating that a phone is resting on the base. This pressure sensor, for example, has a tolerance force of 0.2 Newtons-20 Newtons, which can accommodate the weight and force of any smartphone. The schematic shown in FIG. 6C further illustrates how the strain gauge component can be connected to the microcontroller. In operation, if the pressure sensor reads within a prescribed range, the pressure sensor (by way of its associated circuitry) can be configured to output a signal (e.g., a logic 1) indicating to the microcontroller 340 of the control circuit 280 that a phone is in fact resting on the phone holder 120. As noted, other suitable phone detection sensors provided in the base can be used.

Figure 9:
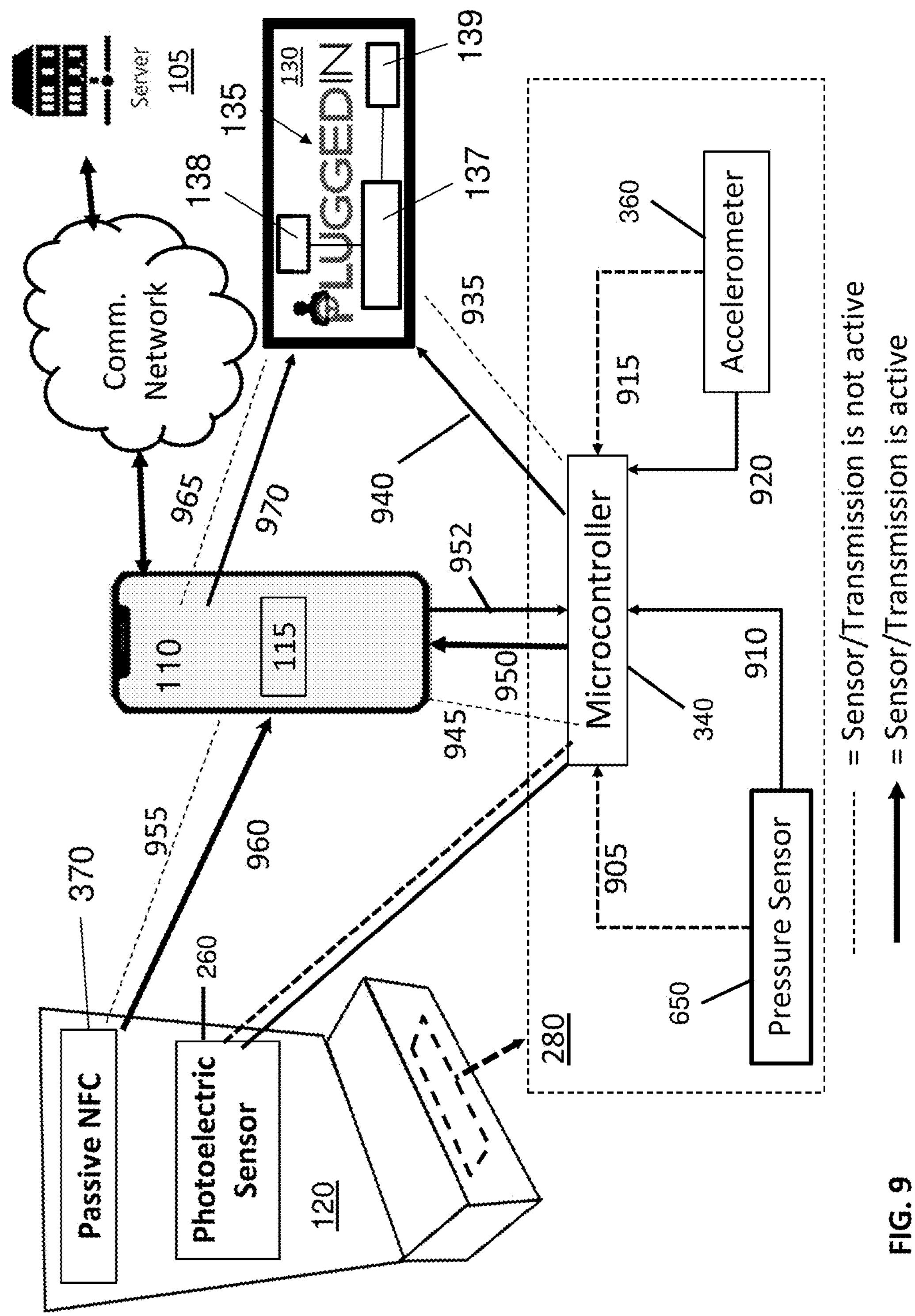
FIG. 9 is a hybrid system and process flow diagram illustrating operation of the system for preventing texting while driving and offering usage-based rewards according to one or more embodiments of the invention.

FIG. 9, which is a high-level hybrid system diagram showing the various components of the system 100, including sub-components of the control circuit 280, and illustrating the information signals exchanged between circuit components during operation. For example, the communication of a logic 1 from the pressure sensor 650 to the microcontroller 340 is demonstrated by the solid line 910. By comparison, an output from the pressure sensor of no signal, or a logic 0 signal, can indicate to the microcontroller that there is either no force resting upon the holder or the force is too great or inconsistent to be coming from that of a smartphone. This is demonstrated by the dotted line 905 shown in FIG. 9. Note, that as known in the art, a microcontroller can be otherwise known and referred to as a microprocessor or processor. To recap, the pressure sensor device serves to provide a confirmation that the phone is in fact resting on the car phone holder and therefore, the driver is not engaging in hand-held phone usage.

Another electronic component located in the phone holder base, which is integrated within the control circuit 280 and, more specifically, connected to the microcontroller 340 is a position sensor. For example, the position sensor can be an accelerometer chip 360 with an integrated magnetometer. Essentially, the accelerometer and magnetometer capture and provide information to the microcontroller that enable the microcontroller to determine whether the car is moving and track its movement. Accordingly, based upon the inputs or action of whether a driver places his phone on the car phone holder and whether the car is driving, the pressure sensor and accelerometer will be transmitting a respective output of either 0 or 1 to the microcontroller. An output logic of zero indicates that the sensor is not active meanwhile an output logic of 1 indicates that the sensor is active.

In addition, the microcontroller 340 can come equipped with a Bluetooth transceiver (not shown) which allows for bi-directional wireless communication between the microcontroller and other devices. More specifically, the microcontroller can be configured to allow for bi-directional communication with the phone when the phone is placed on the car phone holder. The control circuit 280, however, can also incorporate a stand-alone wireless transceiver connected to the microcontroller.

The phone dock can also be configured to communicate with the phone using NFC wireless communication technology. In particular, as shown in FIG. 9 the phone dock can include an NFC tag 370. Depending on the configuration, the NFC tag 370 can provide information to the phone via NFC in dependence on the phone's placement in the holder to the phone. In some configurations the NFC tag can passively provide or receive information to/from the phone. In some configurations the NFC tag can be a transceiver that actively sends and/or receives information from the phone.

For instance, responsive to information read from the NFC tag 370, the phone can be configured to send phone identification information and/or usage information to the phone dock wirelessly. More specifically, in the exemplary configuration shown and described in FIG. 9, the NFC tag can be programmed to provide information to the phone 110 that launches the phone-based application 115. Launching the app 115 can enable further communication between the phone dock control circuit 280 and the phone 110, for instance, via another wireless communication medium (e.g., Bluetooth) as further described herein.

As would be understood, a passive NFC connection includes at least two devices, an initiator and a target (e.g., phone holder and the phone, respectively). The initiator is a device that starts the NFC connection, by generating a radio frequency (RF) field that modulates toward a target device in the form of a request for connection. The target then responds to the initiator request and communication begins. An NFC connection can be established in various modes, Active communication mode and Passive communication mode, depending on the target device. While the initiator is typically a powered device capable of generating an RF field, the target may or may not be capable of generating its own RF field.

In some configurations, the NFC transceiver in the holder can be configured to be a semi-passive mode NFC transceiver, thereby being able to communicate in a passive and/or active mode. In Active mode, both the initiator and target are powered and capable of generating their own RF field to communicate. The initiator starts the communication, and the target responds by modulating its own RF field toward the initiator. In Passive mode, the initiator starts the communication, and the target responds by modulating the initiator's RF field back to the initiator. The target then responds to the initiator request and communication begins. NFC wireless communication operates over a short range, typically under about 4 cm which can serve as a secondary (behind that of the phone holder detection sensor) or alternative mechanism for determining whether the phone is resting on the holder.

Figure 4:
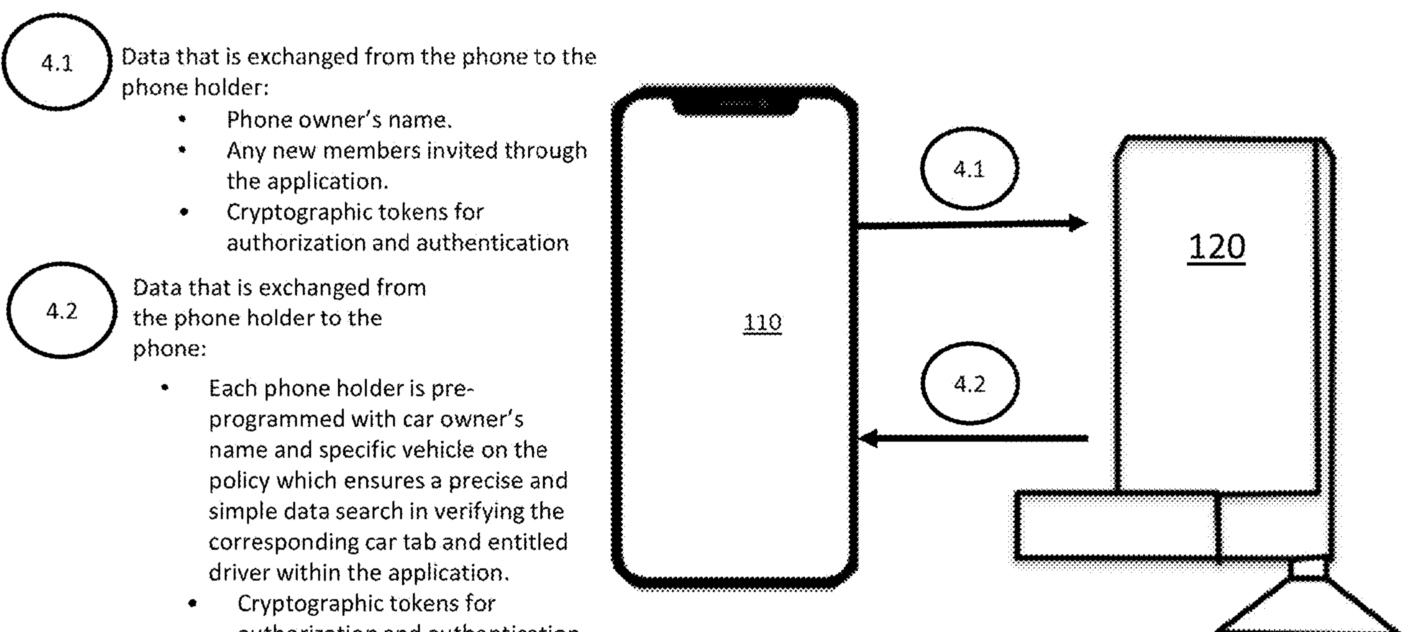
FIG. 4 is a hybrid system and process flow diagram illustrating a wireless sync operation performed by the system of FIG. 1 according to one or more embodiments of the invention.

In addition to detecting whether a phone is placed in a phone dock, the system 100 can be configured to verify that the phone dock is being used in connection with a particular registered vehicle (e.g., the insured vehicle). Similarly, the identity of the vehicle and the driver's phone can also be verified so as to ensure the driver is, in fact, driving an insured vehicle and eligible for insurance rebates or incentives while driving the vehicle. In this regard, a vehicle identification number (VIN) can be sent wirelessly from the application 115 to the phone holder, particularly the microcontroller 340 via Bluetooth. Once a VIN number on the phone holder is captured and associated correctly with the insured carrier, it cannot be changed again unless the Insurance carrier provides that permission to their client. Unique drivers can now be associated with that VIN as the microcontroller within the phone holder can be configured to store this driver-vehicle association information. Accordingly, unique driver identification information that is received from the mobile application via the microcontroller Bluetooth can be verified by the holder. Similarly, the vehicle identification data and/or a unique identifier associated with the phone dock can be provided by the phone dock to the mobile device and can be cross-verified by the phone application or back-end component of the system to ensure the driver is eligible to receive insurance benefits in relation to the vehicle associated with the phone dock. FIG. 4, which is further described herein, illustrates an exemplary exchange of information between the devices and cross-verification.

In the event that both the accelerometer and pressure sensor yield an output logic of 1, the microcontroller will be coded to acquire the sensor's activity while also being on standby to transmit this information to the mobile application via Bluetooth. Upon placing the phone on the holder, the mobile application can be configured to request the microcontroller's transfer of accelerometer and pressure sensor activity under the circumstance of a third sensor being activated and the driver is recognized as an entitled driving member. For clarity, the term entitled driver refers to a driver who is authorized and authenticated to drive the vehicle and thereby registered within the system.

This third sensor can be, for example, the passive NFC tag 370, located within the phone holder. The NFC tag can be provided separate from the control circuit 280 for example, it can be located at the center of the back wall 240 of the phone holder 120. In the exemplary configuration of the system 100, the NFC transceiver in the phone holder is configured to be a passive NFC thereby asserting itself as the initiator for communication to its target. The target, an NFC enabled smartphone device responds by modulating its own RF field toward the initiator. As would be understood by those skilled in the art, a passive NFC transceiver is a short-range radio-frequency device for communicating via an antenna with proximate NFC enabled devices, e.g., an NFC enabled phone.

FIG. 9 demonstrates a hybrid system and process flow diagram with the aforementioned devices of the Pressure Sensor 650, Accelerometer 360, Microcontroller 340, and Bluetooth transceiver (not shown). More specifically, each of these devices are incorporated in the control circuit 280, for instance, on a printed circuit board housed within the base 250 of the phone holder. Although the Bluetooth communication interface is not explicitly and visually shown, it should be understood that information exchange via Bluetooth (or the absence of an active signal) is demonstrated by the communication arrows numbered 935, 940, 945, 950, and 952. Arrows numbered 940, 950, and 952 demonstrate an active Bluetooth communication, meanwhile, arrows 935 and 945 demonstrate a Bluetooth communication that is not active. Bluetooth, or other suitable wireless protocol communications, as demonstrated by the arrows in FIG. 9 system 100, can occur between the phone holder 120 to the phone 110, phone holder to the electronic seal 130, phone to the phone holder, and phone to the electronic seal. A Bluetooth communication is active or not active based upon the operational mode that the system is engaged in. The various operational states/modes and the events that, when detected by the system 100, causes the system to transition into those operational states is further described herein.

Overall, the system 100 provides an innovative Connected Car IoT solution through, inter alia, integration of a "smart" car phone holder 120 with the phone-based application. The smart car mount IoT solution provided by system 100 can allow parents to monitor and restrict their child's driving behavior in real-time.

The application (the "App") 115 executing on the phone 110 can be configured to detect when the phone is placed in the dock 115 (e.g., as a function of the communication between the dock and the phone via the NFC transceivers or other sensor signals). For example, the App 115 is configured to activate as a function of the short-range wireless communication between the dock's NFC tag 370 and the phone via NFC. Once the application is activated, the mobile device can be configured to automatically transition into a restricted use mode. In this restricted-use mode, only certain apps or functions that are safe to use while driving is enabled (see e.g., FIG. 2C). Phone applications that limit the functionality of a phone are well known and thus, it should be understood that known phone applications or various features and functions of known phone applications for preventing texting and driving can be used with the system 100 without departing from the scope of the invention.

In an exemplary configuration of the system 100, the application Google Maps, by Google LLC of Mountain View Calif., can be activated through wireless NFC communication between the phone running App 115 and the phone holder dock 120. As known in the art, music applications such as Spotify and Apple music can be integrated within the Google Maps application. Additionally, making and receiving telephone calls can be enabled within the restrictive setting mode of Google Maps. It is with respect to these three applications (GPS, Music, and Receiving/Making calls) that drivers will have limitations on how they may use them. For instance, as shown in FIG. 2C, exemplary restrictive control functions of the application 115 during use include: if Driving Speed<x MPH, Drivers will be able to freely operate these three applications; If Driving Speed≥x MPH, then Drivers will be limited to voice command regarding GPS Entry, Contacting Someone, and Music Entry. Overall, whenever the phone with the downloaded application 115 is resting on the holder 120, all incoming texts will not be received or alerts not generated. The sender of the message can also be automatically sent an automated customized response from the driver in return.

According to a salient aspect, embodiments of the invention comprise a particular combination of features and operations that serve to: activate the restricted-mode and google maps application through wireless NFC communication between the phone and the phone holder dock; facilitate and transmit the capture of photoelectronic sensor, Pressure Sensor, Accelerometer, and NFC activity as it relates to whether the phone is in use during driving; and also accurately and efficiently calculate usage-based insurance rates and incentives for one or more drivers of the vehicle being driven.

Application Registration and Set-Up

Figure 2A:
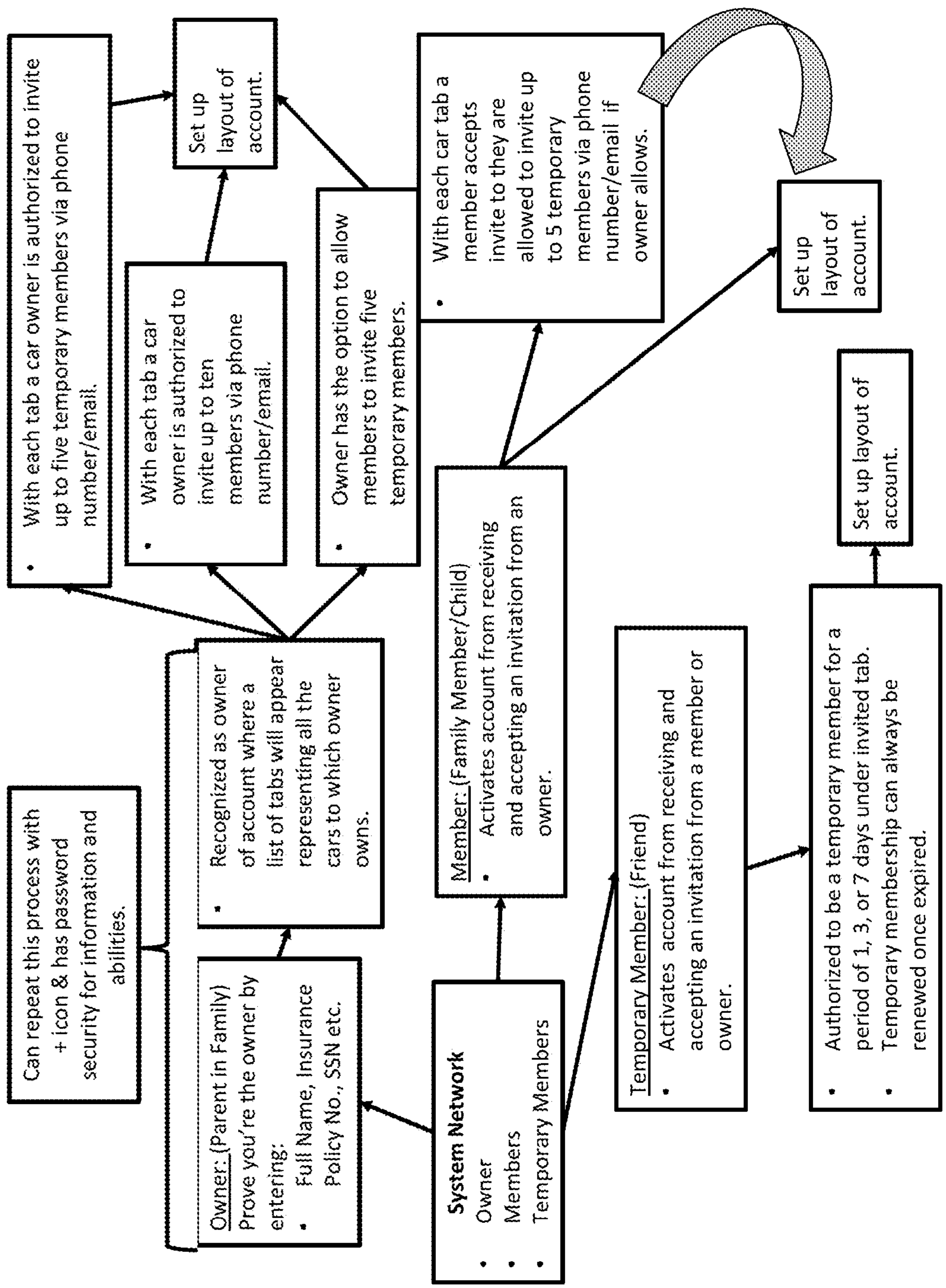
FIG. 2A is a flow diagram illustrating an exemplary routine for registering with the system for preventing texting while driving and offering usage-based rewards including insurance benefits according to one or more embodiments of the invention.

In accordance with one or more embodiments of the system 100, FIG. 2A is a process flow-diagram illustrating exemplary steps performed in connection with the registration of drivers within the system 100. As shown, the system 100 can be configured to be used with a vehicle 150 and specifically configured to incentivize use of the system for various types of drivers 160 including, the owner/account administrator 162 of the vehicle, members 164 (e.g., kids and other insured drivers of the vehicle) and temporary members 166 (e.g., friends who might use the vehicle with the owner's permission).

The registration process, as well as the system functions available to a driver can vary as a function of the type of driver. For instance, a vehicle owner can be prompted to prove they are an owner of the vehicle during registration. Provided the owner is recognized through the registration process, the application can be configured to display a list of vehicles the owner controls and insures with the provider. The list can include actionable links allowing an owner to select a vehicle where they can then add members and invite temporary members. For instance, the application 115 executing on the mobile device can present a user-interface through which the owner can input the telephone number or email for temporary members, thereby causing the back-end system (e.g., server 105), which receives information from the device 110 running application 115, to send a text-message or email invitation to the temporary member at the input phone number or email address. The text message or email can be an actionable link that, when selected by the temporary member, prompts the temporary member to download the application, provide any necessary registration information and accept and activate the temporary membership to the vehicle. As can be appreciated, the application can be configured to allow an owner to invite a maximum number of temporary members. The application can also allow the owner to define use-parameters, say, authorize a temporary member for a prescribed period of time. The application can also allow a temporary member to extend or renew their membership or otherwise cancel and modify a membership. Members can similarly be invited from the owner to register as members. Members can also be extended privileges like inviting temporary members in a similar fashion. Registration can be carried out by the application operating on the phone 110 in conjunction with the back-end system 105 so as to register and store driver information on the back-end system.

Figure 2B:
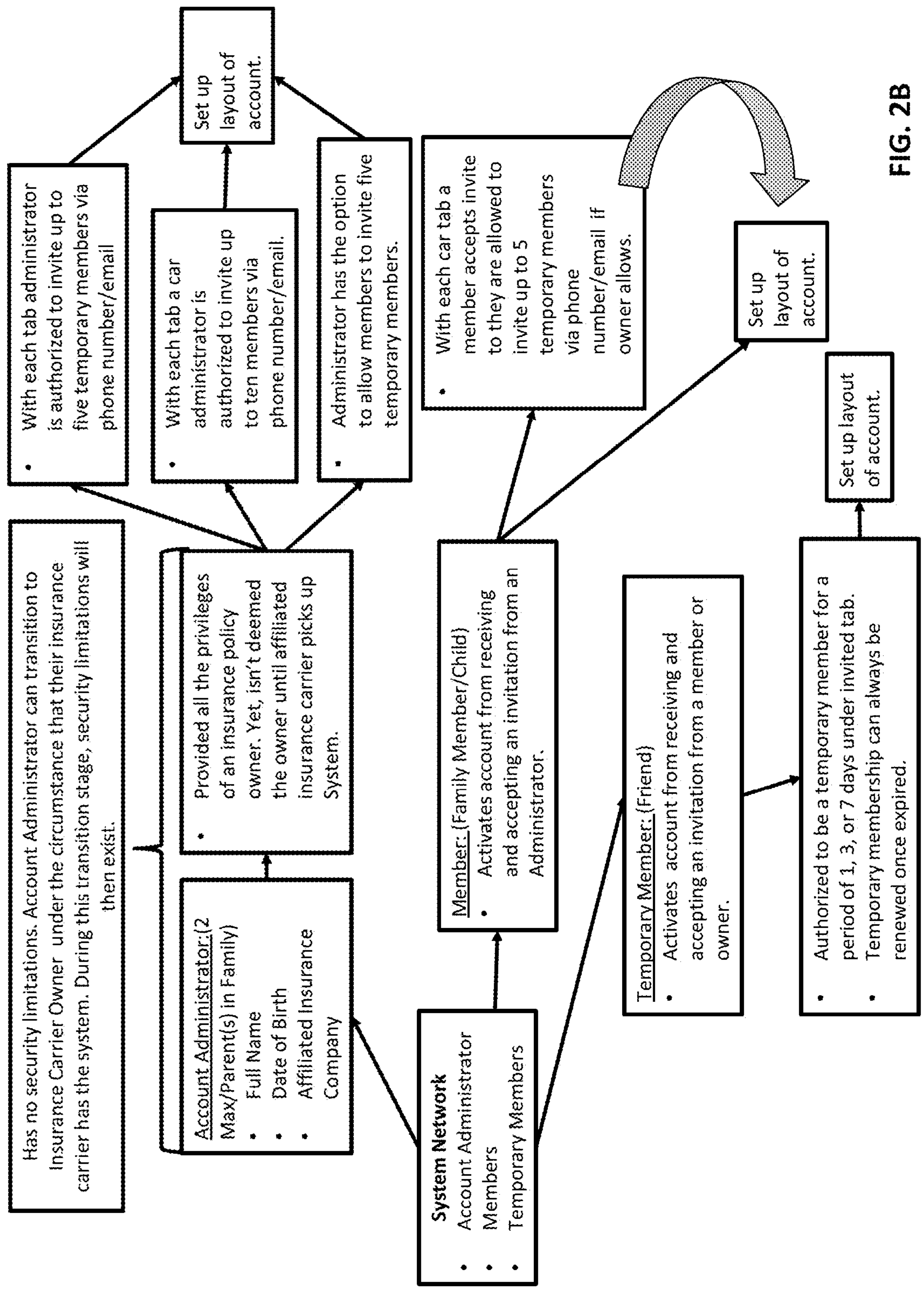
FIG. 2B is a flow diagram illustrating an exemplary routine for registering with an exemplary system for preventing texting while driving and offering usage-based rewards according to one or more embodiments of the invention.

FIG. 2B demonstrates a process flow diagram to a very similar capacity as the registration process shown in FIG. 2A. The primary difference in this case is a role known as Account administrator replaces the aforementioned role of owner. The account administrator role can belong to, for example, a parent wishes to use the system 100 to monitor vehicle usage but whose affiliated insurance company is not integrated with this system 100 as in the example of FIG. 2A. Therefore, an account administrator is not required to engage in a registration process of proving to their insurance company that they are the owner of the vehicle and insurance policy. Account Administrators can transition to the role Owner under the circumstance that their insurance carrier has adopted and uses the system 100. During this transition stage, security authorization and authentication will then exist, and a driver within the family insurance policy may then earn usage-based rewards for their hands free and safe driving behavior. Prior to this transition or when a driver's affiliated insurance company is not equipped with the system, the driver could still be incentivized to drive safely through discounts, coins and rewards beyond insurance (e.g. retail store discounts). These community business store discounts can also apply to driver's whose affiliated insurance company has acquired the system where then that driver will be receiving usage-based insurance benefits and discounts beyond insurance for hands free and safe driving behavior.

Upon driver's registering themselves as owners/account administrators, members, and temporary members, they can also be taken through a facial recognition process. This facial recognition process does not require higher end phones with advanced camera features. Rather, all phones with a like sided, front, or selfie camera to the screen can be utilized within this facial recognition process. When a driver is defined as one of the aforementioned accounts statuses (owners/account administrators, members, and temporary members), a selfie profile picture will be captured and recorded in direct correspondence to the driver's name and account in the driver profile.

Accordingly, subsequent to registration, once the driver sits in the driver's seat and places their phone 110 on the holder 120, which triggers the launch of App 115 and initial verification between the App 115 and the holder 120, he or she can be biometrically verified as a registered driver. Specifically, the application 115 can be configured to, using a camera of the phone 110, capture an image of the driver's face using the front camera of the phone. The application 115, alone or in conjunction with the back-end system 105, can then determine whether the current image of the driver looks like the registered picture associated with their account. To ensure, that the front camera on the phone will be facing a driver and not any passenger(s), the phone holder as previously mentioned can be designed with a limited range of rotation from left to right.

When the phone holder 120 is installed in a car, during the installation procedure, the system's application 115 will register the phone holder's unique identification code with the vehicle it is being installed in within the database maintained by the system's server 105. This identification number will be linked to the car's make, model, year, and VIN.

When a phone 110 with the installed application 115 is placed onto the holder 120, the phone holder and the phone can be configured to wirelessly exchange data. To maintain user data security and user privacy, mutual authorization and authentication can be performed through the exchange of cryptographic tokens. The Bluetooth enabled microcontroller 340 and the Bluetooth enabled phone 110 allows for this communication. The application 115 on the phone will send a token, via Bluetooth, to the phone holder, where it will be verified by the microcontroller 340 against the token stored in the phone holder's memory or computer-readable storage. The microcontroller of the phone holder can similarly send (e.g., reply) with its unique identification code so as to notify the application 115 which holder, and associated car, it is connected to. The application can then send a command to transition the phone holder into authorized driving mode. Upon entering this authorized driving mode, the application is essentially recognizing the driver as an entitled driving member in conjunction with the phone holder and thereby telling the phone holder not to record any anonymous driving data. For clarity, anonymous driving data is interpreted as the total amount of time an unidentified driver is driving while using their phone. Preferably, anonymous driving data is recorded by the phone holder. Upon an entitled driver placing his phone on the holder, the application will routinely request an update from the holder to see if there are any recorded drives or anonymous driving data that needs to be uploaded to the server 105. If there are any drives that need to be uploaded, they will be sent via Bluetooth to the application, and then uploaded to the server by the phone (e.g., via the internet).

Accompanied with the car phone holder and mobile application, the system can also incorporate an LED electronic sign 130 that's placed on the rear windshield of one's vehicle. This LED sign will only light up in one's car when the driver has the downloaded application and is an entitled driver upon placing his phone on the holder thereby activating or tripping all three sensors (Pressure sensor, Accelerometer, and Passive NFC) of the phone holder. If any one of these conditions are not met, then the LED sign will not light up. According to a salient aspect, a lit-up LED car sign serves to visually inform other drivers that the operator of vehicle 150 is driving safely because their phone is authorized and authenticated to engage with the holder. Broadening the scope, surrounding vehicles on the road who have the system and this LED seal lighting up will inform all trailing drivers of whether the car in front of them is properly engaged with the system. Through drivers on the road being visually aware of who is driving hands-free with the system and who isn't provides a sense of awareness and cautiousness on when it is safe to be in close trailing proximity or pass other drivers. Providing drivers with this new information on the road can reduce the rate of accidents. It should be understood that the holder can be configured to illuminate the seal under different conditions from the exemplary scenarios described herein. For example, the holder can be configured to illuminate the seal based on the phone being detected in the holder, irrespective of whether the driver is an entitled driver and irrespective of whether the vehicle is moving. The LED seal 130 is configured to selectively light up and this operation is controlled by an on-board control circuit in communication with the phone holder control circuit 280. In particular, as shown in FIG. 9, the seal can include the control circuit 135 comprising a microcontroller 137, which accesses a computer-readable storage or memory 138, and which controls the illumination device 139 (e.g., the LED). The microcontroller 137 can be Bluetooth enabled or the circuit 135 can include a separate wireless communication chip (not shown). The wireless communication enabled seal control circuit 135 allows it to communicate directly with the phone holder control circuit 280 and/or the phone application 115. In an exemplary configuration of system 100, once the phone holder microcontroller 340 recognizes that an entitled driver has placed his phone 110 on the holder 120, the phone and/or microcontroller 340 can be configured to send a Bluetooth signal to the LED seal effectively instructing the seal controller 137 to light up the LED 139. This communication to the electronic seal can also use other wireless protocols. Although the LED seal's power source is not shown in FIG. 9, the seal can be configured to run on power from an on-board battery, solar power, and/or a 12V cord running from a power outlet in the car.

According to a salient aspect, the incorporation of a seal 130 that is separate from the vehicle holder 120 provides for an added verification factor for the system 100. From an insurance company's perspective, the LED seal can not only reduce the rate of accidents amongst their insureds, but also can prevent fraudulent activity. More specifically, the LED sign 130 can also be associated with a specific VIN of the vehicle 150 and is at least semi-permanently affixed or "sealed" to the rear windshield of the vehicle, therefore, cannot be easily removed once put into place. The VIN number can be pre-programmed into the memory 138 of the seal control circuit 135 during the set-up and installation process of the in-vehicle components of system 100. The pre-programmed VIN number allows for a cross-verification and validation via Bluetooth with the VIN number associated with the phone holder. This cross-verification and validation can be performed by the control circuit 280 and/or the seal's on-board control circuit 135. As can be appreciated, authorization and authentication of the seal can be performed through the exchange of cryptographic tokens between the seal control circuit and phone holder control circuit as well. For example, the microcontroller 340 of the phone holder will send a token, via Bluetooth or other wireless protocol, to the microcontroller 137 of the seal, where it will be verified against the token stored in the electronic seal memory 138. The microcontroller of the electronic seal will then reply with its unique identification code (e.g., token) to tell the phone holder and/or phone that the connection exists and allow for verification of the seal's token. In a further embodiment, this electronic seal can be configured to communicate via wireless protocol with the installed application 115 executing on the user's phone.

Ultimately, the electronic seal confirms to an insurance company that their insureds are not switching phone holders amongst the different vehicles within the policy. Permission must be given from the affiliated insurance carrier if an insured were to add a new phone holder or switch a phone holder to their car within the policy. It should be understood that the system 100 does not necessarily require an electronic seal for basic operation. Alternative configurations of the system 100 can omit the electronic seal depending on specific application requirements. For instance, an LED electronic seal can be presented to a user of the system (e.g., driver/owner or company offering rewards) as an option that, when integrated with the app 115 and holder 120, can provide enhanced features and functionality for the system 100.

Exemplary Operational Modes/Logic States:

The features and functionality of the system 100 will be further appreciated from the following discussion of various exemplary operational modes for the system, the particular circumstances that trigger the system to operate in respective modes, and the features and functionality of the system 100 that are provided when operating in respective modes.

Figure 10B:
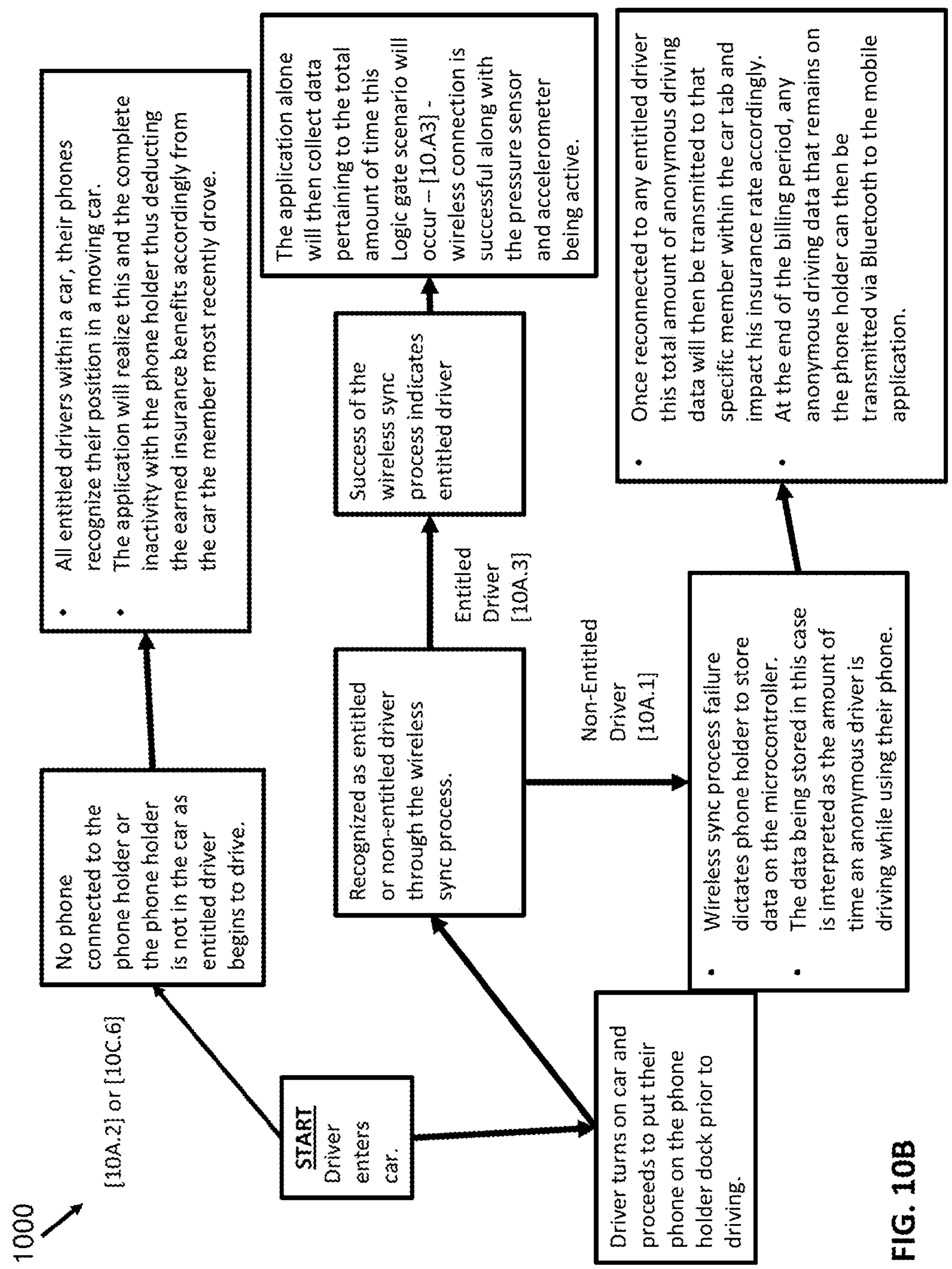
FIG. 10B is a process flow diagram illustrating an exemplary routine for preventing texting while driving and offering usage-based rewards according to one or more embodiments of the invention.

FIG. 10A is a logic table illustrating exemplary inputs determined by the system 100 (each being a logic 1 or 0) and the resulting operational state and corresponding functions performed by the system. FIG. 10A demonstrate three operational modes or logic states when a driver is behind the steering wheel of a vehicle 150, numbered 10A.1-10A.3. FIG. 10B is a process flow diagram illustrating an exemplary routine 1000 for determining the operational states, particularly those listed in FIG. 10A, and exemplary operations of the system 100 in those states. FIG. 10C demonstrates five additional operational modes and logic states when a driver is behind the steering wheel of a vehicle, numbered 10C.1-10C.6.

Determining that the driver is registered with the system 100 is dependent upon whether they have a phone holder/dock 120, an application 115 running on a phone 110 and, optionally, an LED electronic seal 130 if required by the insurance company and placed on the rear windshield of an insured's vehicle. The electronic seal is incorporated within the system and turned on by receiving a wireless signal when all three sensors (e.g., NFC, pressure sensor, and Accelerometer) of the system are active. Any logic state which conveys inactivity amongst any of these three sensors indicates that the system shall not activate the seal. Sensor-based determinations by the system, namely, whether there is wireless communication between phone and holder (e.g., NFC and/or Bluetooth connectivity), vehicle movement sensor and phone detector sensor (e.g., a Pressure sensor 650 or photoelectronic sensor 260, and the like) are each individually activated, will determine the operational mode or logic state. Again, as discussed previously, NFC activates when a driver places their phone 110 on the holder 120 with the downloaded application 115 installed thereon. Upon wireless communication activation, the mobile phone application can then identify the phone holder and vice versa through the cryptography-secured communication previously mentioned. In any case where the vehicle is determined to be moving and the driver is determined to be non-entitled upon placing their phone on the holder, (e.g., by either not having the application or having the application but not being invited or entitled to drive the car) then the phone holder control circuit 280 is configured to record this occurrence as the amount of time a phone is being used by an anonymous driver. This logic primarily applies to scenarios three and six outlined below where the driver has the application thereby activating the NFC, however, may not have been invited or entitled to drive the vehicle.

FIG. 10A demonstrates three of the eight operational modes that are referred to as "real world scenarios." For clarity, the term real world scenarios in the context of this system are defined by events where the vehicle is moving and is most likely to occur based upon the action of whether a system user or driver chooses to engage with his smartphone. More specifically, how that system user or driver chooses to use his smart phone in respect to its proper and entitled placement on the car phone holder 120 while driving. These three real world scenarios are further described herein:

Real World Scenario 1: Upon the driver placing the phone on the car phone holder while driving, he or she may not have the installed application download thereon to their phone [State 10A.1] or, the driver may have the application installed thereon, however, is not entitled or invited to drive that specific car. In both scenarios, the phone holder's pressure sensor and accelerometer are activated therefore, recognizing that a phone is in fact on the car phone holder. However, since the phone holder does not recognize the driver, the holder is configured to record this outcome as anonymous driving data. As previously mentioned, anonymous driving data is interpreted as the total amount of time an unidentified driver is driving while using their phone. The microcontroller can store this anonymous driving data to a significant capacity. Once the control circuit 280 is reconnected to an application 115 determined to be executing on the phone of an entitled driver, this logged anonymous driving data will then be transmitted via Bluetooth to the application 115 and then further transmitted to the cloud database and back-end server 105 which ultimately, will impact the insurance rate accordingly. The LED electronic seal will not light up in this scenario as it will not be receiving a Bluetooth signal from the phone holder and/or phone as demonstrated in FIG. 9 number 935 and/or 965.

Real World Scenario 2: In a second primary scenario, the system 100 can be configured to deduct earned insurance benefits from the car the driver/system user most recently drove. In this event, say, a driver such as an owner/account administrator 162, is determined to be driving the vehicle when a) there is no phone holder in the vehicle [State 10C.6] orb) the driver's phone has not been wirelessly synced with the holder [State 10A.2] (e.g., by virtue of placement of the phone in the holder). Specifically, the application running on the driver's phone can be configured to detect whether the phone is in a moving car. For example, the phone application can be configured to process motion sensor data captured using the phone's on-board accelerometer, a function that is well-known in the art, to determine whether the motion data collected by the phone is consistent with the motion of a moving vehicle and can log the start and stop time and related motion data. By way of further example, the phone application can be configured to detect whether the phone is in a moving vehicle based on a WIFI-Doppler effect measured using the phone's WIFI communications system, as is known in the art. As yet a further example, the phone can be configured to detect whether the phone is in a vehicle based on whether the phone has paired, via a Bluetooth or other wireless connection, with the vehicle's on-board computer, as would be understood by those in the art. While the phone records this data and deducts the earned insurance benefits in this scenario, the phone holder will not be recording any anonymous driving phone usage data. This thereby prevents data overlap between the system simultaneously monitoring a non-entitled phone on the holder (Real-World Scenario 1) and a phone holder in the car, yet no phone connected to it. In real world scenario two, the LED electronic seal will not light up as it will not be receiving a Bluetooth signal from the phone holder and/or phone as demonstrated in FIG. 9 number 935 and/or 965.

Real World Scenario 3: Under the circumstance that an entitled driver places his phone on the holder [State 10A.3] thereby activating/tripping the NFC, Pressure Sensor, and accelerometer, data can then be aggregated by the application and processed to the applications cloud-based database and server. The data being processed to the cloud-based database in this scenario correlates to the proportion of time that an entitled driver is resting their phone on the holder while driving. This usage data correlates to offers in usage-based insurance benefits which incentivizes drivers to use the system. The application operating on the phone and/or the back-end system can perform a further analysis of the data regarding usage-based insurance benefits by identifying how much driving time each specific member is driving during the billing period. The electronic LED seal will light up in this scenario as it will be receiving a Bluetooth signal from the phone holder and/or phone as demonstrated in FIG. 9 number 940 and/or 970.

In addition to the three aforementioned real-world scenarios are five other scenarios and operational modes that can occur when using the system in practice. These five other logic states or operational modes outlined in FIG. 10C as 10C.1, 10C.2, 10C.3, 10C.4, and 10C.5 can be less common than the first three real-world scenarios discussed above. Generally, they are events where the vehicle is not moving and/or simply unlikely to occur based on how a system user or driver will utilize his smart phone in respect to the car phone holder 120 while driving.

Although these five other operational modes are less likely they are not outside the scope of the invention. In fact, the system accounts for these logic states by providing an outcome of each scenario and whether the driver is earning, loosing, or remaining stagnant on their insurance benefits. It is with respect to these statements that these five other operational modes and logic states are disclosed in FIG. 10C and the description herein.

Scenario 4 [10C.1]: In this scenario, the driver is entitled to drive the car and places their phone on the car phone holder. This action by the entitled driver will activate the Pressure sensor and NFC. Yet, since the car is not moving in this situation the accelerometer chip will not be active. As a result of inactivity with the phone holder's accelerometer chip, the system is configured to not record or track any data pertaining to the driver behind the vehicle. As a result, the driver's insurance benefits will remain stagnant thereby he or she is neither losing nor earning insurance benefits. An example of this outcome can occur when an entitled driver is stopped at a traffic light and has their phone on the holder. Even though this is a highly likely situation, it does not meet the criteria of a real-world scenario since the vehicle must be moving. The LED electronic seal will not light up in this scenario as it will not be receiving a Bluetooth signal from the phone holder and/or phone as demonstrated in FIG. 9 number 935 and/or 965.

Scenario 5 [10C.2]: In this situation, a driver is in a non-moving vehicle and decides to place their phone on the holder. Yet, the driver does not have the mobile application downloaded on their phone. This action by the driver will only activate the pressure sensor while the NFC and accelerometer are not active. As a result of the inactivity of the accelerometer chip, the system is configured to not record or track any data pertaining to the driver behind the vehicle. Rather, the insurance benefits will remain stagnant therefore, a driver will neither lose nor earn their insurance benefits. An example of this outcome can occur when a driver without the downloaded application is stopped at a traffic light and places their phone on the holder. Although this is a likely situation, it is not associated as a real-world scenario considering that the car is not moving. The LED electronic seal will not light up in this scenario as it will not be receiving a Bluetooth signal from the phone holder and/or phone as demonstrated in FIG. 9 number 935 and/or 965.

Scenario 6 [10C.3]: Simultaneous to the vehicle moving, an entitled driver with the downloaded application installed thereon decides not to rest their phone on the holder. Rather, the entitled driver chooses to hold their phone in very close proximity to the phone holder thereby activating the NFC. Since the phone is not resting on the holder, the pressure sensor in this case will not be activated. An entitled and recognized driver engaging in this action will result in the phone's mobile application recording this data and the earned insurance benefits being deducted. Given that this is an unlikely situation, it is not associated as a real-world scenario. The LED electronic seal will not light up in this scenario as it will not be receiving a Bluetooth signal from the phone holder and/or phone as demonstrated in FIG. 9 number 935 and/or 965.

Scenario 7 [10C.4]: While the car is not moving, an entitled driver with the downloaded application installed thereon decides not to rest their phone on the holder. Rather, the entitled driver chooses to hold their phone in very close proximity to the phone holder thereby activating the NFC. Since the phone is not resting on the holder, the pressure sensor in this case will not be activated. Due to the inactivity of the accelerometer chip located both inside the phone and the car phone holder, the system is configured to not record or track any data pertaining to the driver behind the vehicle. Given that this is an unlikely situation and the car is not moving, it is not associated as a real-world scenario. The LED electronic seal will not light up in this scenario as it will not be receiving a Bluetooth signal from the phone holder and/or phone as demonstrated in FIG. 9 number 935 and/or 965.

Scenario 8 [10C.5] or [10C.6] even though this scenario has one operational mode or logic state, it can embody two completely different actions by the driver. The first [10C.5] is that the phone holder is in the car, however, it is simply in idle. This stage of idle simply indicates that the car is not moving and there is no phone activity or engagement surrounding the car phone holder. The driver in this case may not even be in their car or have stopped their car to engage in handheld phone usage. In either case, the driver's insurance benefits will remain stagnant as the system is configured to not record or track any data pertaining to the driver behind the vehicle. Although [10C.5] is a likely situation, it is not associated as a real-world scenario considering that the car is not moving. The LED electronic seal will not light up in this scenario as it will not be receiving a Bluetooth signal from the phone holder and/or phone as demonstrated in FIG. 9 number 935 and/or 965.

The second action of this operational mode or logic state can embody a driver removing their phone holder from their vehicle prior to driving. [10C.6] Although the phone holder will not recognize this, the mobile application running on a driver's phone will. The outcome of this action will intersect entirely with the previous description outlined in real world scenario two in that when a driver drives without a phone holder, the mobile application will collect data and deduct the earned insurance benefits accordingly from the car tab the system user most recently drove. Note, that [10C.6] is a real-world scenario considering that the car is moving (recognized from the mobile application) and it is a likely action performed by the driver. The LED electronic seal will not light up in this scenario as it will not be receiving a Bluetooth signal from the phone holder and/or phone as demonstrated in FIG. 9 number 935 and/or 965.

Overall, during operation or movement of the vehicle, the system captures data relating to the vehicle's operation using the phone. Similarly, the phone captures the phone usage data and the phone's status in the phone dock using either the phone and/or phone dock. This collected information can be stored locally and uploaded to the back-end system wirelessly, for instance, over a cellular communication link established between the phone 110 and the remote data-storage component of server 105. As can be respected, the operation of the phone and the holder, and the communication there between, can be specifically configured to monitor vehicle usage while tracking phone usage in a manner that enables the system 100 to effectively calculate usage-based insurance benefits in the eight scenarios as disclosed above.

From an auto-owners perspective the system provides at least the following benefits: a system that more effectively helps to prevent texting while driving and reduces insurance premium costs in an effective manner; gives an owner an opportunity to minimize policy costs (e.g., family's auto insurance policy premium) through various approaches towards usage-based insurance benefits which includes but is not limited to speed, braking, acceleration, and phone usage. From an insurance company's perspective the system provides benefits in that it is configured to: collect actuary sound data by attributing insurance rating on an individual scale with driver to vehicle identification (e.g. phone holder being registered to vehicle) and the ability to differentiate a driver in the car from a passenger (e.g. facial recognition on application accompanied with the phone holder's 90' rotation from left to right). Additionally, the collected vehicle and phone usage data can integrate heavily with data already collected by the insurance company to further inform the insurance premium calculation (e.g., number of tickets, accidents and the like).

Figure 11:
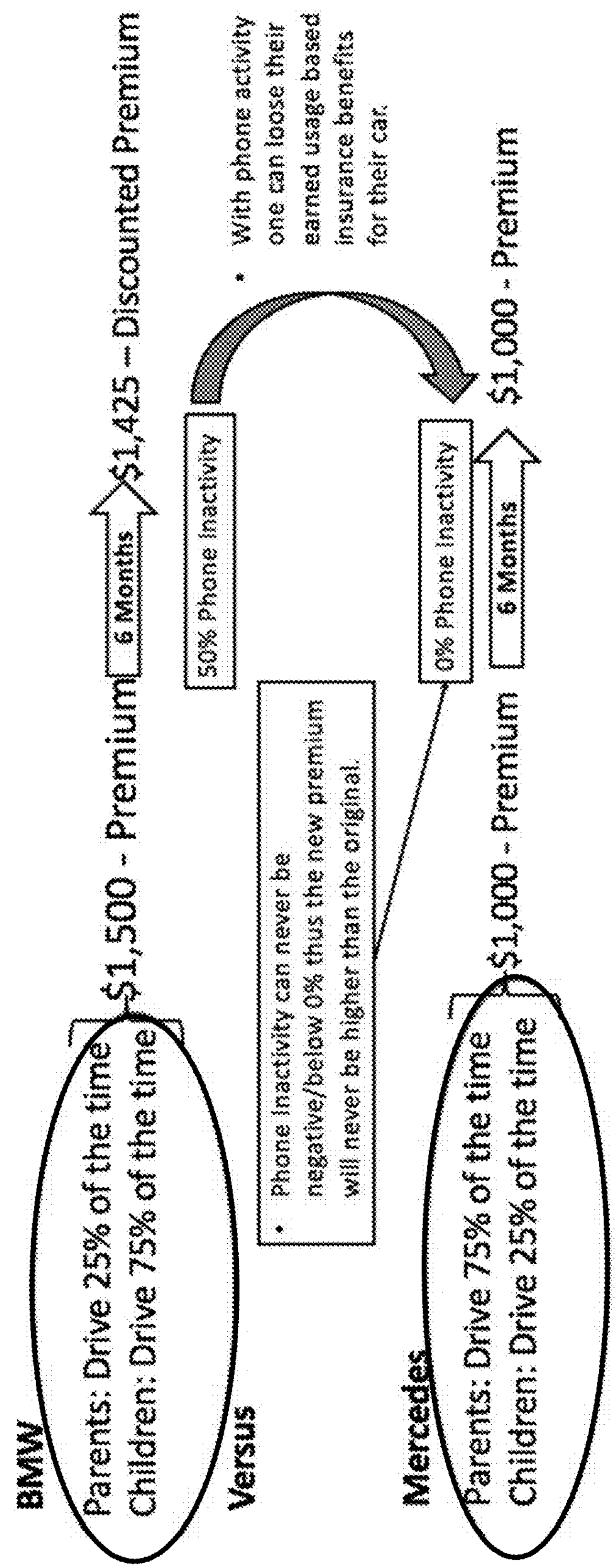
FIG. 11 is a diagram illustrating a hypothetical approach for calculating usage-based insurance-benefits using the system of FIG. 1 in accordance with one or more embodiments of the invention.

A hypothetical simplified approach for calculating usage-based insurance-benefits using the system 100 is illustrated in FIG. 11. FIG. 11, an example with hypothetical numbers meant to illustrate a portion of the value the system 100 can provide. In particular, by observing the total amount of time that each specific family member is driving using the system 100, the back-end database, working on behalf of insurance companies, for example, can more accurately calculate the optimal premium for the client's vehicle. Note, in practice, a suitable amount of usage data can be required, say, the adjustment or rewards can be calculated after the first billing period.

Phone inactivity levels represents the percent of the time during driving that the phone is "inactive" or otherwise being used in a safe manner through being engaged with the phone holder and recognized as an entitled driving member. According to a salient aspect, the system 100 provides a solution in which the driver's identity and phone usage can be determined. Existing stand-alone software solutions do not have capabilities for identifying who exactly is driving the vehicle and what car they are in. Having this information not only can determine a better premium for the client as shown in FIG. 10, however it can go further than that by integrating heavily with data that is already on the table. For example, say a husband and wife share a car where the husband gets many speeding tickets while using the car, yet the wife doesn't get any. It would be beneficial from an actuary and data perspective to reliably determine the usage of an insured vehicle by the husband and wife, respectively. Additionally, the system 100 enables cross checking the number of accidents, speeding tickets, and the like with percentage of time of who's exactly driving a vehicle.

These and other features and functionalities of the system 100 are further described below in connection with an exemplary practical implementation of the systems and methods for preventing texting while driving and offering usage-based insurance benefits.

FIG. 3 is an exemplary view of the application user interface main dashboard. As shown, features and functions presented through the dashboard including:

1. Owners/Account administrator and members have their own individual driving activity score while a temporary member's score reflects the owner/account administrator & member that invited them.
2. Owners/Account administrator have oversight of their own driving activity, members they invite driving activity, and temporary members they invite driving activity.
3. Members have oversight of their own driving activity and temporary members they invite driving activity
4. Temporary members only have oversight of how their driving activity is impacting the owner/account administrator & member to which invited them.
5. Account statuses are interchangeable depending upon the car.

Wireless Syncing Process of Phone and Holder

In one or more embodiments, the phone and holder can be configured to wirelessly sync via Bluetooth when the phone and holder are placed in proximity, (e.g., the phone is placed in the holder.) FIG. 4 further illustrates an exemplary exchange of information between the devices. Specifically, when a driver's smartphone, having the application installed thereon, comes in contact with a phone holder a wireless sync process is initiated which exchanges and verifies data in both directions. Data that is exchanged from the phone to the phone holder (step 4.1) can include information stored on the phone, for example, phone owner's name and any new members invited through the application, as well as cryptographic tokens for authorization and authentication. Data that is exchanged from the phone holder to the phone (step 4.2) can include vehicle and holder-specific information programmed into the holder, as well as cryptographic tokens for authorization and authentication. This information can be pre-loaded onto the holder during a registration process when the holder, vehicle and policy are associated.

In an exemplary configuration, each phone holder is pre-programmed with a car owner's name and specific vehicle details on the policy. This information can be sent to the phone and captured by the phone and ensures a precise and simple data search in verifying the corresponding car details (car tab or profile) and entitled drivers within the application. Overall, the microcontroller or microSD card located in the phone holder (not shown) is the primary location for any data that would be stored on to the phone holder.

An exemplary configuration of hardware components of the phone 110 and holder 120 are shown in FIGS. 1, 5 and 9. In particular, the phone can include an NFC transceiver, as are well known in the art. The holder 120 can include a primary power port 262, a passive NFC transceiver 370, an accelerometer 360, a pressure sensor 650 (or other such phone detector like photo-sensor 260), a microcontroller 340, Bluetooth, and a secondary rechargeable battery power source (not shown). The application 115 executing on the phone 110 can also be configured to determine whether the phone has been placed on a holder before or after the detected driving period using the technology incorporated within the holder. The application can also monitor phone usage data during the detected driving period. Accordingly, the phone can wirelessly communicate the captured data to the back-end system 105 for further processing. For example, the back-end system 105 can thus identify the member's phone in a moving vehicle and the complete inactivity of the phone with respect to a holder and thus calculate an amount to be deducted from the earned insurance benefits from the particular car that the phone owner most recently drove.

In some implementations, the system can be configured to not only identify the amount of time a certain person is driving a car but also driving characteristic/behavior/pattern of that driver (e.g. speed, braking, acceleration, etc.) Accordingly, this information can be selectively shared by the driver for further insurance discounts.

In some implementations, the holder 120 can be integrated into the vehicle and operatively connected to the vehicle's on-board computer. In this exemplary configuration, the holder can be configured to signal the on-board computer as to whether a phone is placed in the holder. The on-board computer can be programmed to require placement of the phone in the holder to enable one or more controls of the vehicle, say, turning the vehicle on.

Discussion of Additional Scenarios and Modes of Operation Beyond the Scope of One Entitled Driver in a Car Additional Scenario 1: A driver who is a Non-Entitled Member is driving and the phone holder is empty. A Non-Entitled driver using his phone or a Non-entitled driver with an empty phone holder is not a scenario the system 100 takes into account because:

1. In some cases, a driver may not want to or simply forget to bring a phone in their car. Therefore, their insurance benefits should remain stagnant neither earning nor losing insurance benefits.
2. One wants to download the application to earn usage-based insurance benefits or earn other driving related discounts rather than their premium being stagnant or paying the same price per item at their local community business store.
3. With a target market of parents in mind, they want their children to be entitled members and drive safe.
4. Need to take into account valet car drivers as they will always be classified as non-entitled driving members.
5. Members wouldn't want to be non-entitled/delete their account midway of billing period as their score will no longer apply for benefits.
6. Insurance carriers have information describing who is on the policy prior to them agreeing to a licensing deal of acquiring the system. This will give insurance companies the benefit of the doubt when a family member is not under a car tab they're supposed to be.

Additional Scenario 2: Driver is not an entitled member; however, a passenger is an entitled member and places their phone in the holder.

As previously mentioned, the phone holder can be designed with a limited range of motion, say, a 90-degree maximum rotation from left to right. As a result, the passenger would be unable to see or use their phone while it is on the holder. Additionally, the front or selfie camera on the phone will not be facing the passenger thereby a facial recognition failure is performed through the mobile application. Although this the key 100% validation strategy to differentiate a driver from a passenger in a vehicle, there are additional features of the application that dissuade improper use of the system such as the restricted-use mode of the phone. As a passenger, the entitled member would be limited to what functions are available, say, the passenger wouldn't be receiving messages.

Moreover, the back-end system 105 or the application on the phone 110 can further apply data-analytics and behavioral analysis algorithms to the data it is logging to identify established patterns and driving behaviors for each entitled member. Accordingly, the system 100 can be configured to compare the vehicle driving motion data collected by the passenger's phone while the non-entitled driver is driving and compare it to the established patterns for the entitled member. Based on the comparison, the system can perform behavioral analytics to determine whether the entitled member is not driving the way he/she usually is.

Additional Scenario 3: Driver is an entitled member; passenger is an entitled member and the driver places their phone in the holder.

In this particular situation, the driver is earning their usage-based insurance benefits according to real world scenario 3 discussed above in connection to [FIG. 10A.3]. However, because they are also in the car and travelling, pursuant to real-world scenario 2 [FIG. 10A.3] discussed above, the passenger's application can also be running and collecting data as if the passenger were driving while not having synced their phone with a holder. To identify this scenario and avoid discrediting the passenger erroneously, the back-end system 105 can be configured to compare the data collected by the driver's and passenger's phone and identify similarities indicative of a registered member being a passenger in a car. For instance, time and location information captured and stored by the back-end system can be compared to identify similar datasets indicative of this additional scenario 3 and, as a result, delete or ignore the passenger phone data in connection with the benefits calculation.

Additional Scenario 4: Two cars on the same insurance plan are travelling together along the same route or simultaneously and each car is occupied by an entitled driver and an entitled member. Additionally, all drivers and passengers are entitled to drive either car under the plan. Furthermore, the driver of the first car placed their phone in the holder of the first car, however, the driver of the second car has not placed their phone in the holder of the second car.

To identify this scenario and avoid discrediting the passenger(s) erroneously, the back-end system 105 can be configured to compare the time and location data collected by all of the phones to identify the driver and passenger of the first car and distinguish those individuals from the occupants of the second car. For instance, time and location information captured and stored by the back-end system can be compared to identify similar datasets indicative of a driver and passenger being in the same car and, as a result, delete or ignore the passenger phone data in connection with the benefits calculation. In addition, the system can identify the two members in the second car and award/discount rewards as described in additional scenario 5 below.

In other words, the system can determine the entitled passenger member in a first car and not take off any earned insurance discounts from him. Proximity of members together indicated enables the system to determine they are in the same car and distance apart enables the distinction between different cars. The location sensor data can be necessary to determine who is in which car because, otherwise, it would appear as if four entitled members are in one car instead of split amongst the two.

In other words, since the applications are running and recording the same exact time for both people in the car, the passenger is not being impacted because the system will recognize that they are together in the car (location based data comparison) and the entitled member is getting his usage-based insurance benefits already. Again, the passenger is not losing rewards because the exact overlapping of time along with the same location will allow the system to eliminate any data that the application is collecting for the passenger at that time.

Additional Scenario 5: An entitled passenger is in a car with an entitled member who is driving, and the phone holder is empty.

The system 100 can be configured to handle this scenario and calculate benefits adjustments according to multiple options. In accordance with the previously discussed exemplary monitoring and calculation processes, the system can be configured to treat both passenger and driver as if they were driving. As a result, they might both be losing their usage-based insurance benefits for the car they drove most recently. This would give insurance companies the benefit of the doubt and incentivize the entitled member to put their phone on the holder. Alternatively, as previously discussed, the system can be configured to determine that they are both in the same vehicle based on a comparison of the location sensor data recorded by the phones. Accordingly, one can arbitrarily be selected (e.g., using a randomization method for selection) and treated as a driver and the other as a passenger. As a result, only one member would potentially lose insurance discount however, the one who is driving won't be known.

Additional Scenario 6: An entitled member passenger is in a car with an entitled temporary member who is driving, and the phone holder is empty.

This scenario can be detected in the manner discussed with additional scenario 5. However, exemplary options for assigning/deducting insurance benefits can include:

Option 1: With location sensors on phones, the system can determine that they are both in the same car and only have the entitled member lose their earned insurance discount benefits instead of their impact being double the scale. (Entitled member may not be driving but nonetheless since he/she invited a temporary member who reflects their driving score, he/she would be losing his usage-based insurance benefits for the most recent car tab he/she drove or that his/her invited temporary member was engaged with.)

Option 2: Since temporary member's driving activity reflects that of member, the member in this case would be impacted on double the scale, and if it were two temporary members in the car it would be triple and so on.

With the implementation of location sensors, the system will use driving data and check ins to build and monetize data through data mining and mapping. For instance, the system will be able to detect when an insured is going to a healthy grocery store or workout facilities thereby allowing say, a life insurance carrier to improve their insured's rating and/or premium based upon these healthy lifestyle choices and behaviors.

Figure 12:
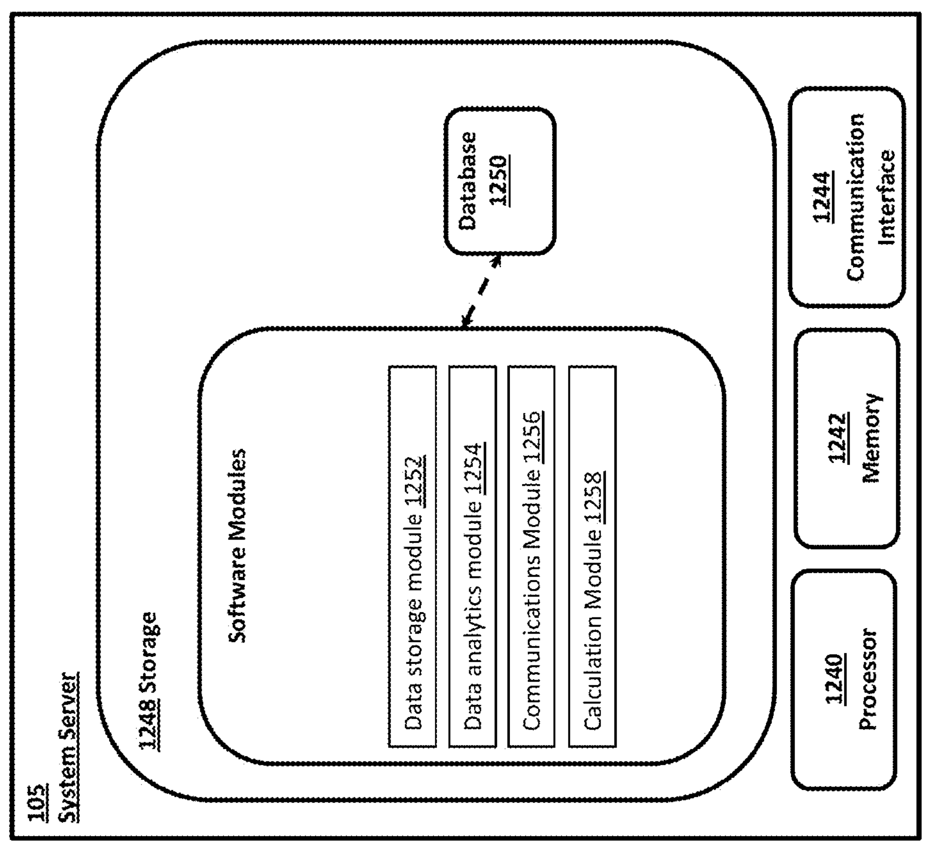
FIG. 12 is a block diagram illustrating an exemplary configuration of a back-end system server in accordance with one or more embodiments of the invention.

FIG. 12 is a block diagram further illustrating the exemplary arrangement of hardware and software components of the back-end system server 105. As shown, the System server 105 includes various hardware and software components that serve to enable operation of the system 1200, including one or more processors 1240, a memory 1242, one or more local and/or remote storage units 1248 and a communication interface 1244. The processor serves to execute or otherwise implement one or more programs in the form of executable instructions that can be loaded into memory 1242. The processor can be a number of processors, a central processing unit CPU, a graphics processing unit GPU, a multi-processor core, or any other type of processor, depending on the particular implementation.

Preferably, the memory 1242 and/or the storage 1248, are accessible by the processor and comprise one or more non-transitory storage mediums, thereby enabling the processor to receive and execute instructions encoded therein so as to cause the System server 105 and its various components to carry out operations of the systems and methods described herein. Memory can be, for example, a random-access memory (RAM) or any other suitable volatile or non-volatile computer readable storage medium. In addition, the memory can be fixed or removable. The storage can take various forms, depending on the particular implementation. For example, the storage can contain one or more components or devices such as a hard drive, a flash memory or some combination of the above. Storage also can be fixed or removable.

One or more software modules are encoded in the storage and/or in the memory. The software modules can comprise one or more software programs or applications comprising computer program code or instructions that are executed in the processor 1240. Such computer program code or instructions configure the processor to carry out operations of the systems and methods disclosed herein and can be written in any combination of one or more programming languages.

In an exemplary embodiment shown in FIG. 12 and described herein, the software modules can include a data storage module 1252 that coordinates storage of data on a database 1250, a data analysis module 1254 that configures the server 1205 to perform the various data analysis operations, a communications module 1256 that configures the server 1205 to communicate with remote computing devices, and a benefits calculation module 1258 that configures the server 1205 to calculate benefits based on the stored data.

The program code can execute entirely on the system server 1205, as a stand-alone software package. However, in some implementations, the program code can also execute partly on the System server 105 or another computing device/system. In the latter scenario, the other systems can be connected to the System server 105 through any type of network (not shown), including a local area network (LAN)

or a wide area network (WAN), mobile communications network, cellular network, or the connection can be made to an external computer (for example, through the Internet using an Internet Service Provider). It can also be said that the program code of software modules and one or more computer readable storage devices from a computer program product that can be manufactured and/or distributed in accordance with the present invention, as is known to those of ordinary skill in the art. It should also be understood that in some illustrative embodiments, one or more of the software modules can be downloaded over a network to the system server 105 from another device or system via communication interface 1244.

As described, the storage 1248 preferably contains and/or maintains various data items and elements that are utilized throughout the various operations of the System server 105. The information stored in the storage can include but is not limited to a database 1250 of vehicle information, insurance plan information, insurance and data-storage structures for storing other information including sets of rules generated by the System server. It should be noted that although storage 1248 and/or database are depicted as being configured locally to the System server 105, in certain implementations the storage and/or the data elements described as being stored therein can also be located remotely, such as on a remote data storage system that is accessible to the System server 105 in a manner known to those of ordinary skill in the art.

At various points during the operation of the system 100, the System server 105 can communicate with one or more computing devices, such as user-facing devices 110, remote data resources and the like. Such computing devices transmit and/or receive data to/from the System server 105, thereby preferably initiating maintaining, and/or enhancing the operation of the system 100. Accordingly, a communication interface 1244 is also operatively connected to the processor 1240 and can be any interface that enables communication between the System server 105 and external devices, machines and/or elements. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

Figure 13:
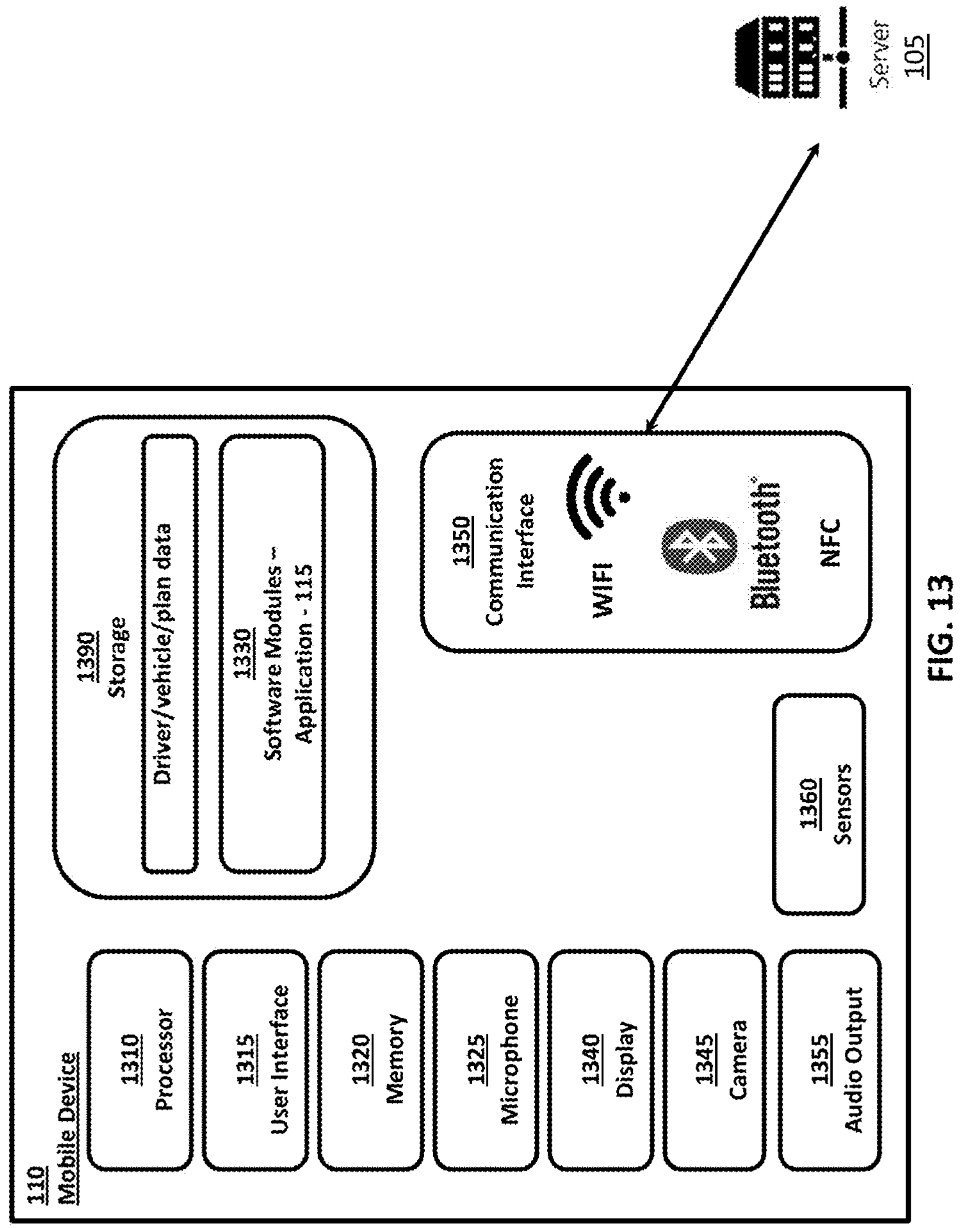
FIG. 13 is a block diagram illustrating an exemplary configuration of a smartphone in accordance with one or more embodiments of the invention.

FIG. 13 is a block diagram illustrating an exemplary configuration of the mobile device 110 including its hardware and software components. As shown, the mobile device 110 includes various hardware and software components that serve to enable operation of the device, including one or more processors 1310, a memory 1320, a microphone 1325, a display 1340, a camera 1345, an audio output 1355, a storage 1390 and a communication interface 1350. Processor 1310 serves to execute or otherwise implement an Application in the form of software instructions that can be loaded into memory 1320. Processor 1310 can be a number of processors, a central processing unit CPU, a graphics processing unit GPU, a multi-processor core, or any other type of processor, depending on the particular implementation.

Preferably, the memory 1320 and/or the storage 1390 are accessible by the processor 1310 and comprise one or more non-transitory storage media, thereby enabling the processor to receive and execute instructions encoded in the memory and/or on the storage so as to cause the mobile device and its various hardware components to carry out operations for aspects of the systems and methods described herein. Memory can be, for example, a random-access memory (RAM) or any other suitable volatile or non-volatile computer readable storage medium. In addition, the memory can be fixed or removable. The storage can take various forms, depending on the particular implementation. For example, the storage can contain one or more components or devices such as a hard drive, a flash memory or some combination of the above. Storage also can be fixed or removable.

One or more software modules are encoded in the storage 1390 and/or in the memory 1320. The software modules can comprise one or more software programs or applications (e.g., the Application) comprising computer program code or instructions that are executed in the processor 1310. Such computer program code or instructions configure the processor to carry out operations of the systems and methods disclosed herein and can be written in any combination of one or more programming languages. Preferably, the program code executes entirely on mobile device 1310, as a stand-alone software package. However, in some implementations, the program code can also execute partly on mobile device and partly on system server 105, or entirely on server 105 or another remote device. In the latter scenario, the remote systems can be connected to mobile device 110 through any type of network (not shown), including a local area network (LAN) or a wide area network (WAN), mobile communications network, cellular network, or the connection can be made to an external computer (for example, through the Internet using an Internet Service Provider).

It can also be said that the program code of software modules and one or more computer readable storage devices (such as memory 1320 and/or storage 1390) form a computer program product that can be manufactured and/or distributed in accordance with the present invention, as is known to those of ordinary skill in the art. It should also be understood that in some illustrative embodiments, one or more of the software modules can be downloaded over a network to storage 1390 from another device or system via communication interface 1350.

As described, the storage 1390 preferably contains and/or maintains various data items and elements that are utilized throughout the various operations of the mobile device 110. The information stored in storage can include but is not limited to driver information, vehicle information, insurance plan information, driving data logged by the device 110, and other entitled driver information. It should be noted that although storage is depicted as being configured locally to mobile device 110, in certain implementations the storage and/or the data elements described as being stored therein can also be located remotely, such as on the remote database 180 that is accessible to the system server 105, and can be accessible to the user-side devices through a communications connection in a manner known to those of ordinary skill in the art.

A user interface 1315 is also operatively connected to the processor. The interface can be one or more input or output device(s) such as switch(es), button(s), key(s), a touchscreen, microphone, etc. as would be understood in the art of personal computing devices. User interface serves to facilitate the capture of commands from the user (e.g., on-off commands) or information and settings related to operation of the system 100. For example, interface serves to facilitate the capture of certain information from the mobile device 110 such as personal information for enrolling with the system 100, inviting other entitled drivers, adding vehicles and personal and driving data.

An audio output 1355 is also operatively connected to the processor 1310. Audio output can be any type of speaker system that is configured to play audio data files as would be understood by those skilled in the art. The mobile device 110 can also include a display 1340 which is also operatively connected to the processor 1310. The display includes a screen or any other such presentation device which enables the system to instruct or otherwise provide feedback to the user regarding the operation of the system for 100. By way of example, the display can be a digital display such as a dot matrix display or other 2-dimensional display. By way of further example, the interface and the display can be integrated into a touch screen display. Accordingly, the display is also used to show a graphical user interface, which can display various data, provide interactive "forms" that allow for the entry of information by the user, virtual buttons and the like. Touching the touch screen at locations corresponding to the display of a graphical user interface allows the person to interact with the device to enter data, change settings, control functions, etc. Mobile device 110 can also include a camera 1345 capable of capturing digital images.

In addition, the mobile device can also include one or more microphones 1325 for capturing audio recordings. Various other hardware devices/sensors 1360 can also be operatively connected to the processor. The sensors 1360 can include: a GPS sensor for tracking global position; an on-board clock to track time of day and otherwise time events; an accelerometer to track the orientation and acceleration of the mobile device; a gravity magnetometer to determine the 3-dimensional orientation of the mobile device; proximity sensors to detect a distance between the mobile device and other objects and other such devices as would be understood by those skilled in the art.

While certain of the components utilized in the monitoring system and method are understood devices, their coordination under program control and the combination of particular resources (such as on-board camera, clock, processor, GPS, and so on) to implement the driver monitoring system and method provides technological advances in the art of unsupervised tracking of driver phone use and calculation of insurance rebates.

At various points during the operation of the system 100, the mobile device 110 can communicate with one or more computing devices, such as network 105. Such computing devices transmit and/or receive data to/from mobile device 110, thereby preferably initiating maintaining, and/or enhancing the operation of the system 100. Accordingly, a communication interface 1350 is also operatively connected to the processor 1310 and can be any interface that enables communication between the mobile device 110 and external devices, machines and/or elements including server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

It is to be understood that like numerals in the drawings represent like elements through the several figures, and that not all components and/or steps described and illustrated with reference to the figures are required for all embodiments or arrangements.

The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for preventing unsafe usage of a smartphone by a driver while the driver is operating a vehicle and providing usage-based benefits, the apparatus comprising:

- an application enabled on the driver's smartphone, the application comprising instructions in the form of code that are executable by the smartphone;
- a smartphone holder arranged to be mounted inside the vehicle, the holder including:
  - a body configured to receive and support the smartphone during normal operation of the vehicle;
  - a mount connected to the body, wherein the mount is adapted to attach the body to an interior surface of the vehicle such that a screen of the smartphone being supported by the body is facing the driver of the vehicle;

an NFC tag provided within the body, wherein the NFC tag is programmed to launch an instance of the application enabled on the smartphone, and wherein the application enabled on the smartphone is configured to launch upon communication with the NFC tag;

a control circuit disposed within the body, the control circuit comprising:

a processor, a computer-readable storage medium accessible by the processor, a communication interface in electronic communication with the processor, a sensor for detecting the presence of the smartphone resting on the body, the sensor being in electronic communication with the processor, and instructions stored in the storage medium and executable by the processor, wherein the instructions, when executed by the processor, configure the processor to:

determine, based on a signal output by a sensor, whether the smartphone is resting against the body of the phone dock, and wherein, one or more of the application enabled smartphone and the processor of the control circuit are configured to record usage data including information relating to operation of the vehicle and any usage of the smartphone during vehicle operation, wherein the recording of usage-data is performed as a function of determining whether the phone is resting against the body of the phone dock.

2. The system of claim 1, the control circuit further comprising:

a control circuit disposed within the body, the control circuit comprising:

an accelerometer in electronic communication with the processor, and wherein the instructions, when executed by the processor, configure the processor to:

determine, from a signal output by the accelerometer, whether the vehicle is moving at a speed in excess of a prescribed threshold, wherein the recording of usage-data is performed as a function of determining whether the vehicle is moving at a speed in excess of a prescribed threshold; and a cloud-based server device in communication with the application enabled smartphone, wherein server computing device is configured to receive the usage data from the smartphone, and wherein the cloud based server computing device is configured to calculate, based on the received usage data, usage-based rewards for the driver or an owner of the vehicle.

3. The system of claim 1, wherein the sensor for detecting the presence of the smartphone resting on the body is one of a pressure sensor, a strain gauge and a photoelectric sensor.

4. The system of claim 1, wherein the control circuit processor is configured to be communicatively coupled with an on-board computer of the vehicle via the communication interface, and wherein the processor is configured to determine whether the vehicle is moving at a speed in excess of the prescribed threshold based on information received from the on-board computer, and wherein the recording of usage-data is performed as a function of determining whether the vehicle is moving at a speed in excess of a prescribed threshold.

5. The system of claim 1, wherein the base and mount are joined by a pivot mechanism configured to allow the base to pivot relative to the mount.

6. The system of claim 5, wherein the pivot mechanism comprises a ball joint having a limited range of rotational motion about a longitudinal axis.

7. The system of claim 1, further comprising: an electronic seal arranged to be affixed to an interior surface of a rear window of the vehicle, wherein the seal comprises:

an LED light being electronically controlled by a controller, wherein the controller is in wireless electronic communication with the control circuit of the smartphone holder, and wherein the controller is configured to selectively illuminate the LED light in response to a wireless signal received from the holder control circuit or smartphone application.

8. The system of claim 7, wherein the controller of the seal and the processor of the smartphone holder are configured to exchange identification information and, wherein the controller illuminates the LED light in response to validation of the exchanged identification information by one or more of the processor of the holder and the controller of the electronic seal.

9. The system of claim 8, wherein upon launch of the application responsive to the NFC tag, the application configures the smartphone to wirelessly transmit identification information to the control circuit; and wherein the instructions further configure the processor of the control circuit to:

receive identification information from the smartphone via the wireless communication interface, and determine, based on the identification information and information identifying entitled drivers stored in the storage medium, whether the smartphone is associated with a driver that is entitled to drive the vehicle; and wherein the usage data is recorded as a function of the determination that the smartphone is associated with a driver that is entitled to drive the vehicle.

10. The system of claim 1, wherein the base further comprises adjustable side rails extending in a direction of a back-wall of the base and configured to extend along a left and right side of the smartphone when placed in the holder, and wherein the adjustable side rails are arranged to resist the smartphone sliding off of the base.

11. A method for preventing unsafe usage of a smartphone by a driver while the driver is operating a vehicle and providing usage-based benefits, the method comprising:

providing an application enabled on the driver's smartphone, the application comprising instructions in the form of code that are executable by the smartphone;

providing a smartphone holder arranged to be mounted inside the vehicle, the holder including:

a body configured to receive and support the smartphone during normal operation of the vehicle;

an NFC tag provided within the body, wherein the NFC tag is programmed to launch the application enabled on the smartphone;

a control circuit disposed within the body, the control circuit comprising:

a processor, a computer-readable storage medium accessible by the processor, a communication interface in electronic communication with the processor, a sensor for detecting the presence of the smartphone resting on the body, the sensor being in electronic communication with the processor, and instructions stored in the storage medium and executable by the processor, determining, by the processor using the sensor, whether the smartphone is resting against the body of the phone dock;

causing, by the NFC tag, the application enabled on the smartphone to launch in response to communication with the NFC tag;

recording, by one or more of the application enabled smartphone and the processor of the control circuit, usage data including information relating to operation of the vehicle and any usage of the smartphone during vehicle operation, wherein the recording of usage-data is performed as a function of determining whether the phone is resting against the body of the phone dock.

12. The method of claim 11, further comprising:

receiving, by the processor from the smartphone executing the application over a wireless communication interface, identification information concerning the smartphone;

determining, with the processor based on the received identification information and information identifying entitled drivers stored in the storage medium, whether the smartphone is associated with a driver that is entitled to drive the vehicle, wherein the recording of usage-data is performed as a function of determining whether the smartphone is associated with the driver that is entitled to drive the vehicle;

calculating, based on the usage data, usage-based rewards for the driver or an owner of the vehicle.

13. The method of claim 12, further comprising:

determining, by the processor of the control circuit, whether the vehicle is moving at a speed in excess of a prescribed threshold and wherein the recording of usage-data is performed as a function of determining that the vehicle is moving at the speed in excess of the prescribed threshold; and transmitting, by the smartphone application, the usage data to a cloud-based server device, wherein the cloud-based server computing device is configured to calculate the usage-based rewards based on the received usage data.

14. The method of claim 13, further comprising:

transmitting, by the processor to an electronic seal arranged to be affixed to a rear window of the vehicle, a wireless signal configured to cause the LED light of the electronic seal to illuminate, wherein the wireless signal is transmitted as function of determining whether the smartphone is associated with a driver that is entitled to drive the vehicle, determining whether the phone is resting against the body of the phone dock and determining whether the vehicle is moving at the speed in excess of the prescribed threshold.

15. The method of claim 11, further comprising:

wherein the control circuit processor is configured to be communicatively coupled with an on-board computer of the vehicle via the communication interface, and determining, by the processor, that the vehicle is moving at a speed in excess of a prescribed threshold based on information received from the on-board computer, and wherein the recording of usage-data is performed as a function of determining that the vehicle is moving at the speed in excess of the prescribed threshold.

16. The method of claim 15, further comprising:

receiving, by the processor from the smartphone executing the application over a wireless communication interface, identification information concerning the smartphone;

determining, with the processor based on the received identification information and information identifying entitled drivers stored in the storage medium, whether the smartphone is associated with a driver that is entitled to drive the vehicle; and wherein the usage data is recorded as a function of determining whether the smartphone is associated with the driver that is entitled to drive the vehicle.

17. The method of claim 11, wherein the sensor is one or more of a pressure sensor and a photoelectric sensor.

18. The method of claim 11, wherein the holder further comprises a mount connected to the body, wherein the mount is adapted to attach to an interior surface of the vehicle and wherein the base and mount are joined by a pivot mechanism configured to allow the base to pivot relative to the mount with a limited range of motion.

* * * * *